United States Patent
Raz et al.

(10) Patent No.: US 12,458,619 B2
(45) Date of Patent: Nov. 4, 2025

(54) TERPENE-ENRICHED CANNABINOID COMPOSITION FOR TREATMENT OF MALE SUBJECTS

(71) Applicant: BUZZELET DEVELOPMENT AND TECHNOLOGIES LTD., Or Akiva (IL)

(72) Inventors: Noa Raz, Gizo (IL); Aharon Eyal, Jerusalem (IL); Carmi Raz, Gizo (IL)

( * ) Notice: Subject to any disclaimer, the term of this patent is extended or adjusted under 35 U.S.C. 154(b) by 568 days.

(21) Appl. No.: 17/144,171

(22) Filed: Jan. 8, 2021

(65) Prior Publication Data

US 2021/0128522 A1    May 6, 2021

Related U.S. Application Data

(63) Continuation-in-part of application No. PCT/IB2019/055772, filed on Jul. 7, 2019.

(60) Provisional application No. 62/695,056, filed on Jul. 8, 2018.

(51) Int. Cl.

| | | |
|---|---|---|
| A61K 31/352 | (2006.01) | |
| A61K 9/00 | (2006.01) | |
| A61K 9/20 | (2006.01) | |
| A61K 31/01 | (2006.01) | |
| A61K 31/015 | (2006.01) | |
| A61K 31/045 | (2006.01) | |
| A61K 31/05 | (2006.01) | |
| A61K 31/125 | (2006.01) | |
| A61K 31/202 | (2006.01) | |
| A61K 31/353 | (2006.01) | |
| A61K 33/30 | (2006.01) | |
| A61K 36/185 | (2006.01) | |
| A61K 36/19 | (2006.01) | |
| A61K 36/258 | (2006.01) | |
| A61K 36/31 | (2006.01) | |
| A61K 36/46 | (2006.01) | |
| A61K 36/53 | (2006.01) | |
| A61K 36/889 | (2006.01) | |
| A61K 47/26 | (2006.01) | |
| A61K 47/38 | (2006.01) | |
| A61K 47/46 | (2006.01) | |
| A61P 13/08 | (2006.01) | |
| A61P 15/10 | (2006.01) | |
| A61P 25/22 | (2006.01) | |
| A61P 25/24 | (2006.01) | |
| A61P 25/26 | (2006.01) | |
| A61P 25/28 | (2006.01) | |
| A61P 31/00 | (2006.01) | |
| A61P 35/00 | (2006.01) | |

(52) U.S. Cl.
CPC ............ *A61K 31/352* (2013.01); *A61K 9/006* (2013.01); *A61K 9/007* (2013.01); *A61K 9/0078* (2013.01); *A61K 9/20* (2013.01); *A61K 31/01* (2013.01); *A61K 31/015* (2013.01); *A61K 31/045* (2013.01); *A61K 31/05* (2013.01); *A61K 31/125* (2013.01); *A61K 31/202* (2013.01); *A61K 31/353* (2013.01); *A61K 33/30* (2013.01); *A61K 36/185* (2013.01); *A61K 36/19* (2013.01); *A61K 36/258* (2013.01); *A61K 36/31* (2013.01); *A61K 36/46* (2013.01); *A61K 36/53* (2013.01); *A61K 36/889* (2013.01); *A61K 47/26* (2013.01); *A61K 47/38* (2013.01); *A61K 47/46* (2013.01); *A61P 13/08* (2018.01); *A61P 15/10* (2018.01); *A61P 25/22* (2018.01); *A61P 25/24* (2018.01); *A61P 25/26* (2018.01); *A61P 25/28* (2018.01); *A61P 31/00* (2018.01); *A61P 35/00* (2018.01)

(58) Field of Classification Search
None
See application file for complete search history.

(56) References Cited

U.S. PATENT DOCUMENTS

2013/0059018 A1    3/2013    Parolaro et al.

FOREIGN PATENT DOCUMENTS

| CA | 2356020 | * 12/2006 |
|---|---|---|
| EP | 1900372 A1 | 9/2006 |
| WO | 2007063268 A1 | 6/2007 |
| WO | 2007108632 A1 | 9/2007 |

(Continued)

OTHER PUBLICATIONS

Food for breast cancer, 7 pages, 2023.*

(Continued)

*Primary Examiner* — Michael V Meller
(74) *Attorney, Agent, or Firm* — AlphaPatent Associates Ltd.; Daniel J. Swirsky

(57) ABSTRACT

Provided is a method for treating conditions and/or symptoms associated therewith selected from the group consisting of androgen deficiency, male infertility, male urogenital or reproductive system infections and/or disorders and combinations thereof, comprising administering to a subject in need a therapeutically effective amount of a composition comprising at least one cannabinoid in a specific amount, at least one terpene in a specific amount, at least 5% by weight of a non-cannabinoid, non-terpene carrier, and optionally at least one herbal extract, wherein said non-cannabinoid, non-terpene carrier comprises cellulose and a weight/weight ratio of a total amount of terpenes to a total amount of cannabinoids is from about 0.1:1 to about 1:1, or; wherein said non-cannabinoid, non-terpene carrier comprises less than 5% by weight cellulose and a weight/weight ratio of a total amount of terpenes to a total amount cannabinoids is about 0.05:1 to about 1:1.

1 Claim, No Drawings

(56) References Cited

FOREIGN PATENT DOCUMENTS

WO    2016019353 A1    12/2012
WO    2017158539 A1    9/2017

OTHER PUBLICATIONS

Cannabis 101, 7 pages, 2023.*
International Preliminary Report on Patentability for PCT/IB2019/055772 issued Jan. 12, 2021.
International Search Report for PCT/IB2019/055772 mailed Nov. 6, 2019.

* cited by examiner

TERPENE-ENRICHED CANNABINOID COMPOSITION FOR TREATMENT OF MALE SUBJECTS

CROSS-REFERENCE TO RELATED APPLICATIONS

This patent application is a Continuation-in-Part (CIP) of PCT international application number PCT/IB2019/055772, having an international filing date of Jun. 7, 2019, published as international publication number WO 2020/012315 A1, which is hereby incorporated by reference in its entirety; which claims benefit and priority from U.S. 62/695,056, filed on Jul. 8, 2018, which is hereby incorporated by reference in its entirety.

FIELD OF THE INVENTION

The field of art to which this invention generally pertains is terpene-enriched compositions, and specifically terpene-enriched compositions for therapeutic use.

BACKGROUND OF THE INVENTION

Andropause or partial androgen deficiency of the ageing male (PADAM) is a condition that is associated with the decrease in the male sex hormone testosterone. The decrease in androgen and the development of symptoms is more gradual than what occurs in women.

Approximately 30% of men in their 50s will experience symptoms of andropause caused by low testosterone levels. A person experiencing andropause may have a number of symptoms related to the condition and could be at risk of other serious health conditions such as osteoporosis without proper treatment.

Terpenes play important roles in cannabinoids-comprising compositions, affecting the functionality and bioavailability of the cannabinoids and the aroma of the composition. Processing *Cannabis* plant material typically leads to terpenes loss so that most of *Cannabis* compositions are of relatively low terpene content. That is particularly true for *Cannabis* extracts and compositions thereof, such as *Cannabis* tablets, *Cannabis* gel capsules, *Cannabis* patches, *Cannabis* suppositories, etc. Most *Cannabis* terpenes boiling points are in the range between about 15° C. and about 220° C. and they evaporate, at least partially, during *Cannabis* buds drying, during solvent separation from extracts and during decarboxylation. Monoterpenes are lost at a rate greater than that of terpenes with a higher molecular weight and terpenes carrying no hydroxyl groups are lost at a rate greater than that of terpenes that do carry hydroxyl groups.

SUMMARY OF THE INVENTION

According to an aspect of some embodiments of the present invention, there is provided a method for treating conditions and/or symptoms associated therewith selected from the group consisting of androgen deficiency, male infertility, male urogenital or reproductive system infections and/or disorders and combinations thereof, the method comprising administering to a subject in need a therapeutically effective amount of a composition comprising (i) at least one cannabinoid in a specific amount, (ii) at least one terpene in a specific amount, (iii) at least 5% by weight of a non-cannabinoid, non-terpene carrier, and (iv) optionally at least one herbal extract, (a) wherein said non-cannabinoid, non-terpene carrier comprises cellulose and a weight/weight ratio of a total amount of terpenes to a total amount of cannabinoids in said composition is from about 0.1:1 to about 1:1, or;

(b) wherein said non-cannabinoid, non-terpene carrier comprises less than 5% by weight cellulose and a weight/weight ratio of a total amount of terpenes to a total amount cannabinoids in said composition is about 0.05:1 to about 1:1.

According to an embodiment, said composition comprises at least one selected from the group consisting of a) less than 5% by weight glycol b) less than 20% by weight water; c) chlorophyll; and d) at least one flavonoid.

According to an embodiment, said conditions and/or symptoms associated therewith are selected from the group consisting of prostate abnormality, prostate cancer, impaired and/or reduced fertility, hot flashes, sweating, fatigue, irritability, decreased physical and/or mental energy, memory loss, depression, anger anxiety, nervousness, restless, stress, mood swing, affect disorder, muscle tension, myalgia, decreased muscle mass, intermittent dizziness, weight gain, urinary incontinence, lower urinary tract disorders, male urogenital and/or reproductive system infection, reduced libido and/or sexual desire, sexual dysfunction, hair loss and/or hair thinning, irregular body odor, conditions and/or symptoms induced by androgen deficiency, conditions and/or symptoms associated with partial androgen deficiency of the ageing male (PADAM), andropause and combinations thereof.

According to an embodiment, said composition further comprises an additive selected from the group consisting of antioxidants, emulsifiers and texturizers vegetable oils, plant extracts, honey, sucrose, glucose and fructose, pharmaceutical excipients and combinations thereof.

According to an embodiment, said at least one terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol, farnesene, and combinations thereof.

According to an embodiment, said at least one terpene is selected from the group consisting of thujone, pinene, limonene, cymene, caryophyllene, caryophyllene oxide, eucalyptol, terpineol, sabinene, linalool, cardinol, carene, geraniol, camphor, viridiflorol, germacrene, citronellol, myrtenol, santalol and combinations thereof, and wherein said conditions and/or symptoms associated therewith comprise a prostate abnormality.

According to an embodiment, said composition further comprises a compound selected from the group consisting of zincum metallicum, omega 3, genistein, daidzein, glycitein and combinations thereof and/or a herbal extract selected from the group consisting of extracts of *Althea officinalis, andrographis paniculata, Anemarrhenae asphodeloides, Apium graveolens, Arctostaphylos uva-ursi, Barosma betulina, Coptis chinensis, Echinacea* spp, *Hydrastis canadensis, Plantago* spp, *Uncaria tomentosa, Zea mays, Serenoa*

*serrulate, Urtica dioica, Pigeum africanum, Opuntia ficus indica, Ganoderma lucidum, Silybum marinum* and combinations thereof.

According to an embodiment, said at least one terpene is selected from the group consisting of myrcene, pinene, limonene, caryophyllene, caryophyllene oxide, terpinene, citronellol, linalool, humulene, amyrin, cycloartenol and combinations thereof, and wherein said conditions and/or symptoms associated therewith comprise prostate cancer.

According to an embodiment, said composition further comprises a compound selected from the group consisting of lycopene, curcumin, epigallocatechin gallate, omega 3, capsaicin, selenium, vitamin D, allicin and combinations thereof and/or a herbal extract selected from the group consisting of extracts of *Serenoa serrulate, Camellia sinensis, Silybum marinum, Tabebuia impestiginosa*, red clover, *Punica granatum, Zingiber officinalis, Ginseng* and combinations thereof.

According to an embodiment, said at least one terpene is selected from the group consisting of citronellol, geraniol, nerol, farnesol, eucalyptol, sabinene, caryophyllene, pinene, limonene, santalol, linalool, terpineol, terpinene and combination thereof, and wherein said conditions and/or symptoms associated therewith comprise male infertility.

According to an embodiment, said composition further comprises a compound selected from the group consisting of phenyl acetonitrile, zincum metallicum, omega 3 and combinations thereof and/or a herbal extract selected from the group consisting of extracts of *Lepidium meyenii, Panax Ginseng, Serenoa serrulata, Withania somnifera, Lycium barbarum, Ginseng, Epimedium grandiflorum, Turnera diffusa Vitex agnus castus, Withania somnifera, Ginseng, Eucommia ulmoides, Tribulus terrestris, Psoralea drupaceae, Alpinia galanga, Alpinia officinarum, Boesenbergia rotunda, Kaempferia galanga* and combination thereof.

According to an embodiment, said at least one terpene is selected from the group consisting of limonene, linalool, terpineol, geraniol, eucalyptol, pinene, citronellol and combinations thereof, and wherein said conditions and/or symptoms associated therewith comprise reduced libido and/or sexual dysfunction. According to some such embodiments, said composition further comprises a compound selected from the group consisting of phenyl acetonitrile, zincum metallicum, omega 3 and combinations thereof and/or a herbal extract selected from the group consisting of extracts of *Epimedium grandiflorum, Ganoderma lucidum, Lepidium meyenii, Turnera diffusa, Vitex agnus castus, Withania somnifera, Ginseng, Eucommia ulmoides, Tribulus terrestris, Psoralea drupaceae, Alpinia galanga, Alpinia officinarum, Boesenbergia rotunda, Kaempferia galanga* and combinations thereof.

According to an embodiment, said at least one terpene is selected from the group consisting of linalool, terpineol, eucalyptol, borneol, camphor, pinene, geraniol and combinations thereof, and wherein said conditions and/or symptoms associated therewith comprise hair loss and/or hair thinning and wherein said composition optionally further comprises an herbal extract selected from the group consisting of extracts of *Rehmania glutinosa preparata, Rosmarinus officinalis, Serenoa serrulata, Urtica dioica* and combinations thereof.

According to an embodiment, said at least one terpene is selected from the group consisting of linalool, terpineol and combinations thereof, and wherein said conditions and/or symptoms associated therewith comprise irregular body odor.

According to an embodiment, said at least one terpene is selected from the group consisting of caryophyllene, caryophyllene oxide, carene, linalool, myrcene, terpinene, terpineol, citronellol, eucalyptol, nerolidol, limonene, geraniol, menthol, iso-menthone, germacrene, pinene, cardinol, neral, geranial, menth-2-en-1-ol, bisabolol, phytol, pulegone, cymene, fenchol, humulene, guaiol, borneol, carene, sabinene, myrtenol, camphene, nerol, farnesol, carotol and combinations thereof, and wherein said conditions and/or symptoms associated therewith comprise partial androgen deficiency of the ageing male (PADAM) and/or andropause. According to some such embodiments, said composition further comprises a compound selected from the group consisting of drupanol, genistein, daidzein, glycitein and combinations thereof and/or a herbal extract selected from the group consisting of extracts of *Angelica sinensis, Anemarrhenae asphodeloides, Cimicifuga (actaea) Racemosa, Glycyrrhiza glabra. Hypericum perforatum, Panax quinquefolium, Trifolium pratense, Avena sativa, Cimicifuga (actaea) Racemosa, Humulus lupulus, Hypericum perforatum, Lavendula officinalis, Melissa officinalis, Passiflora incarnata, Valeriana officinalis, Eucommia ulmoides, Tribulus terrestris, Ginseng, Psoralea drupaceae, Alpinia galanga, Alpinia officinarum, Boesenbergia rotunda, Kaempferia galanga* and combinations thereof.

According to an embodiment, said at least one terpene is selected from the group consisting of myrcene, humulene, caryophyllene, linalool, terpineol, geraniol, pinene, germacrene, citronellol, limonene, myrcene, terpinene, menth-2-en-1-ol, borneol, eucalyptol, myrtenol, cymene, caryophyllene oxide, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene, thujone and combinations thereof, and wherein said conditions and/or symptoms associated therewith comprise male urogenital and/or reproductive system infection and/or disorder and wherein said composition optionally further comprises a herbal extract selected from the group consisting of extracts of *Apium graveolens, Dioscorea villosa* spp, *Althea officinalis, Anemarrhenae asphodeloides, Anemarrhenae asphodeloides, Apium graveolens, Arctostaphylos uva-ursi, Barosma betulina, Coptis chinensis, Echinacea* spp, *Equisitum arvense, Hydrastis canadensis, Plantago* spp, *Serenoa serrulata, Uncaria tomentosa, Urtica dioica, Viola tricolor, Zea mays* and combinations thereof.

According to an embodiment, the method as disclosed herein comprises administering to said subject for a first period of time a first said composition comprising a first cannabinoid at a first cannabinoid amount and a first terpene at a first terpene amount, followed by one selected from the group consisting of:
  (i) administering to said subject for a second period of time said composition comprising said first cannabinoid at said first cannabinoid amount or less and a second terpene at a second terpene amount, wherein said second terpene is different from said first terpene;
  (ii) administering to said subject for a second period of time said composition comprising said first cannabinoid at said first cannabinoid amount or less and a first terpene at an increased first terpene amount; and
  (iii) administering to said subject for a second period of time said composition comprising said first cannabinoid at a said first cannabinoid amount or less, first terpene at a first terpene amount and a second terpene, wherein said second terpene is different from said first terpene.

According to an embodiment, said composition is provided in a delivery form selected from the group consisting of tablets, gel capsules, medical patches, topicals, creams, varnishes, sublingual oils, sprays, edibles, suppositories, rectal candles, cigarettes, vaporizer liquids, nasal preparations, preparations containing micro and/or nano-emulsions, preparations containing micro and/or nano-particles and combinations thereof.

DETAILED DESCRIPTION OF THE INVENTION

As used herein, the term "treating" includes preventing, curing, ameliorating, mitigating and reducing the instances or severity of a condition or a symptom thereof.

As used herein, the term "secondary adverse symptoms" refers to adverse symptoms of the main condition; to symptoms of another condition of the treated subject; and/or to symptoms related to administration of the composition or other drugs.

Unless indicated otherwise, percent is weight percent and ratio is weight/weight ratio. Unless indicated otherwise, weight ratio means the ratio between weight content, e.g. in an aqueous solution containing 20% solute and 80% water, the solute to water weight ratio is 20:80 or 1:4.

Unless indicated otherwise, the term "cannabinoid" refers to a compound that affects the endocannabinoid system. Cannabinoids are agonists or antagonists to receptors in the endocannabinoid system.

As used herein, the term "THC" refers to THCa (tetrahydrocannabiniolic acid) and/or to THC (tetrahydrocannabiniol) unless indicated otherwise. As used herein, the term CBD refers to CBDa (cannabidiolic acid) and/or to CBD (cannabidiol) unless indicated otherwise. As used herein, the term CBG refers to CBGa (cannabigerolic acid) and/or to CBG (cannabigerol) unless indicated otherwise. As used herein, the term CBN refers to CBNa (Cannabinolic acid) and/or to CBN (cannabinol) unless indicated otherwise. As used herein, the term CBC refers to CBCa (cannabichromenic acid) and/or to CBC (Cannabichromene) unless indicated otherwise. As used herein, the term CBL refers to CBLa (Cannabicycol acid) and/or to CBL (Cannabicyclol) unless indicated otherwise. As used herein, the term THCV refers to THCVa (tetrahydrocannabivarin acid) and/or to THCV (tetrahydrocannabivarin) unless indicated otherwise. As used herein, the term CBDV refers to CBDVa (cannabigerovarin acid) and/or to CBDV (cannabidivarin) unless indicated otherwise.

As used herein, the term "glycol" refers to any glycol, including ethylene glycol, polyethylene glycol, propylene glycol and polypropylene glycol. As used herein, the term chlorophyll refers to chlorophyll and degradation products thereof.

Unless indicated otherwise, the term "partial androgen deficiency of the ageing male (PADAM) and/or andropause" refers to androgen deficiency in aging men.

Unless indicated otherwise, the term "androgen" refers to any natural or synthetic steroid hormone which regulates the development and maintenance of male characteristics in vertebrates by binding to androgen receptors. This includes the embryological development of the primary male sex organs, and the development of male secondary sex characteristics at puberty. Androgens are synthesized in the testes, the ovaries, and the adrenal glands. Unless indicated otherwise androgen refers to testosterone and/or dihydrotestosterone.

Unless indicated otherwise, conditions and/or symptoms associated with partial androgen deficiency of the ageing male (PADAM) and/or andropause include hot flashes, sweating, fatigue, irritability, decreased physical and/or mental energy, memory loss, depression, anger, anxiety, nervousness, restless, stress, mood swing, affect disorder, muscle tension, myalgia, decreased muscle mass, intermittent dizziness, weight gain, reduced libido and/or sexual desire, sexual dysfunction, hair loss and/or thinning, irregular body odor and combinations thereof.

Unless indicated otherwise, the term "male urogenital system" refers to at least one of testes, epididymis, vas deferens, ejaculatory ducts, urethra, penis, prostate and accessory glands. Unless indicated otherwise, male urogenital system refers to male urinary and/or reproductive system.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

According to an aspect of some embodiments of the present invention, provided is a terpene-enriched composition for treating conditions and/or symptoms associated therewith in a male subject, the composition comprising (i) at least one cannabinoid in a specific amount, (ii) a primary terpene in a specific amount, (iii) at least 5% by weight of a non-cannabinoid, non-terpene, carrier, (iv) optionally at least three secondary terpenes and (a) wherein the non-cannabinoid, non-terpene carrier comprises cellulose and a weight/weight ratio of a total amount of terpenes to total amount of cannabinoids in the composition is from about 0.1:1 to about 1:1, or (b) wherein the non-cannabinoid, non-terpene carrier comprises less than 5% by weight cellulose and a weight/weight ratio of a total amount of terpenes to a total amount of cannabinoids in the composition is from about 0.05:1 to about 1:1.

As used herein, the term "terpene-enriched" composition refers to a composition comprising terpenes and cannabinoids, wherein the ratio of terpenes to cannabinoids is higher than that occurring in nature in *Cannabis* plants. The ratio of terpenes to cannabinoids occurring in nature in *Cannabis* plants is in the range of from about 0.001 to less than about 0.05:1.

According to an aspect of some embodiments of the present invention, provided is a terpene-enriched composition comprising:
  (i) at least one cannabinoid in a specific amount,
  (ii) a primary terpene in a specific amount,
  (iii) at least 5% by weight of a non-cannabinoid, non-terpene carrier,
  (iv) optionally at least three secondary terpenes, and;
  (a) wherein said at least one non-cannabinoid, non-terpene carrier comprises cellulose and a weight/weight ratio of a total amount of terpenes to a total amount of cannabinoids in the composition is from about 0.1:1 to about 1:1, or;
  (b) wherein said at least one non-cannabinoid, non-terpene carrier comprises less than 5% by weight cellulose and a weight/weight ratio of a total amount of terpenes to a total amount of cannabinoids in the composition is about 0.05 to about 1.0
  for use in treating conditions and/or symptoms associated therewith in a male subject.

According to an embodiment, said conditions and/or symptoms associated therewith are selected from the group consisting of androgen deficiency, male infertility, male urogenital or reproductive system infections and/or disorders.

According to an embodiment, the composition has a therapeutic effect upon administration, which is an enhanced therapeutic effect compared with of the therapeutic effect obtained by administration of a composition comprising a same specific cannabinoids amounts and one fifth an amount of said primary terpene.

According to an embodiment, the enhanced therapeutic effect is selected from the group consisting of a shortened onset time of the therapeutic effect, an increased magnitude of the therapeutic effect, an extended duration of the therapeutic effect, a reduced requirement for the composition, a reduction in at least one secondary adverse symptom, a reduced frequency of at least one of the conditions and/or symptoms associated therewith, a reduced severity of the conditions and/or symptoms associated therewith, a reduce consumption of other drugs and combinations thereof.

According to an embodiment, the conditions and/or symptoms are selected from the group consisting of prostate abnormality, prostate cancer, impaired and/or reduced fertility, hot flashes, sweating, fatigue, irritability, decreased physical and/or mental energy, memory loss, depression, anger anxiety, nervousness, restless, stress, mood swing, affect disorder, muscle tension, myalgia, decreased muscle mass, intermittent dizziness, weight gain, urinary incontinence, lower urinary tract disorders, male urogenital and/or reproductive system infection, reduced libido and/or sexual desire, sexual dysfunction, hair loss and/or thinning, irregular body odor, conditions and/or symptoms induced by androgen deficiency, conditions and/or symptoms associated with partial androgen deficiency of the ageing male (PADAM) and/or andropause and combinations thereof.

According to an embodiment, the composition comprises at least two cannabinoids, at least three, at least four or at least five. According to an embodiment, the content of each cannabinoid in the composition is at least 10 parts per million (ppm). As known in the art, cannabinoids have an acid form and a non-acid form (which is also referred to as decarboxylated form, since it can be generated by decarboxylating the acid form). The acid form is indicated herein by the letter (a) at the end of the cannabinoid acronym, e.g. tetrahydrocannabiniolic acid is indicated as THCa, while the decarboxylated form is THC. According to an embodiment, the cannabinoids are selected from the group consisting of tetrahydrocannabiniol in acid or decarboxylated form (THCa or THC, respectively), cannabidiol in acid or decarboxylated form (CBDa or CBD, respectively), cannabigerol in acid or decarboxylated form (CBGa or CBG, respectively), cannabichromene in acid or decarboxylated form (CBCa or CBC, respectively) tetrahydrocannabivarin in acid or decarboxylated form (THCVa or THCV, respectively), Cannabidivarin in acid or decarboxylated form (CBDVa or CBDV respectively), Cannabinol in acid or decarboxylated form (CBNa or CBN, respectively), Cannabicyclol in acid or decarboxylated form (CBLa or CBL, respectively). As used herein, the term THC refers to THCa (tetrahydrocannabiniolic acid) and/or to THC (tetrahydrocannabiniol) unless indicated otherwise. As used herein, the term CBD refers to CBDa (cannabidiolic acid) and/or to CBD (cannabidiol) unless indicated otherwise. As used herein, the term CBG refers to CBGa (cannabigerolic acid) and/or to CBG (cannabigerol) unless indicated otherwise. As used herein, the term CBN refers to CBNa (Cannabinolic acid) and/or to CBN (cannabinol) unless indicated otherwise. As used herein, the term CBC refers to CBCa (cannabichromenic acid) and/or to CBC (Cannabichromene) unless indicated otherwise. As used herein, the term CBL refers to CBLa (Cannabicycol acid) and/or to CBL (Cannabicyclol) unless indicated otherwise. As used herein, the term THCV refers to THCVa (tetrahydrocannabivarin acid) and/or to THCV (tetrahydrocannabivarin) unless indicated otherwise. As used herein, the term CBDV refers to CBDVa (cannabigerovarin acid) and/or to CBDV (cannabidivarin) unless indicated otherwise. Thus, the term "CBD to THC ratio" may mean "CBD to THC ratio", "CBDa to THC ratio", "CBD to THCa ratio", "CBDa to THCa ratio", "CBD to THC+THCa ratio", "CBDa to THC+THCa ratio", "CBD+CBDa to THC ratio", "CBD+CBDa to THCa ratio" or "CBD+CBDa to THC+THCa ratio".

According to an embodiment, at least one of the cannabinoids is in acid form. According to an embodiment, at least one of the cannabinoid is at least partially in decarboxylated form. According to an embodiment, at least 50% of the cannabinoid is in decarboxylated form, at least 60%, at least 70%, at least 80% or at least 90%.

According to an embodiment, the composition comprises THC and/or THCa. According to an embodiment, the composition comprises CBD and/or CBDa. According to an embodiment, the composition comprises THC and/or THCa at a content of less than 1%, less than 0.8%, less than 0.6%, less than 0.4% or less than 0.2%. According to an embodiment, the composition comprises both CBD and/or CBDa and THC and/or THCa and the weight/weight ratio between CBD and/or CBDa and THC and/or THCa ((CBD+CBDa)/(THC+THCa)) is at least 10, at least 15, at least 20, at least 25 or at least 30. According to an embodiment, the composition comprises CBG and/or CBGa. According to an embodiment, the composition comprises CBN and/or CBNa. According to an embodiment, the composition comprises CBC and/or CBCa. According to an embodiment, the composition comprises CBL and/or CBLa. According to an embodiment, the composition comprises THCV and/or THCVa. According to an embodiment, the composition comprises CBDV and/or CBDVa.

According to an embodiment, the composition comprises at least 5% by weight carrier, at least 10%, at least 15%, at least 20%, at least 25%, at least 30%, at least 35% or at least 40% by weight. Any compound other than cannabinoids and terpenes is a suitable carrier. According to an embodiment, the carrier is selected from the group consisting of vegetable oils, e.g. coconut oil, olive oil or sesame oil, pharmaceutical excipients, honey, bees wax, cellulose and combinations thereof. As used herein, the term "cellulose" refers to cellulose, hemicellulose and their combinations.

According to an embodiment, the product comprises a primary terpene and optionally at least three secondary terpenes, at least four or at least five. The term "terpene", as used herein, refers to both terpenes and terpenoids.

As used here, the term "primary terpene" refers to a single terpene or a mixture of terpenes, which single terpene or mixture of terpenes forms at least 20% by weight of the total amount of terpenes in the product, at least 30%, at least 40%, at least 50%, at least 60%, at least 70% or at least 80%. As used here, the term "secondary terpene" refers to a single terpene that forms at least 0.00001% of the product and less than 10% by weight of the total amount of terpenes in the composition, less than 15%, less than 10%, less than 5%, less than 2% or even less than 1%. According to an embodiment, the content of the primary terpene in the product is at least 2 times greater than that of any secondary terpene, at least 4, at least 6, at least 8, at least 10, at least 15, at least 20, at least 25, or at least 30 times greater.

According to an embodiment, the primary terpene comprises a single terpene and said single terpene forms at least 20% by weight of the total amount of terpenes in the product, at least 30%, at least 40%, at least 50%, at least 60%, at least 70% or at least 80%.

According to another embodiment, the primary terpene comprises a mixture of terpenes, e.g. two terpenes, three terpenes, four terpenes, five terpenes or more. According to another embodiment, each one of the terpenes forms between e.g. 1% and e.g. 40% by weight of the total amount of terpenes in the product and together form at least 20% by weight of the total amount of terpenes in the product, at least 30%, at least 40%, at least 50%, at least 60%, at least 70% or at least 80%.

According to another embodiment, the primary terpene comprises a mixture of terpenes, e.g. three terpenes, four terpenes, five terpenes or more, out of which two or three form between e.g. 10% and e.g. 40% by weight of the total amount of terpenes in the product, while the rest of the terpenes in the mixture form between e.g. 1% and e.g. 10% by weight of the total amount of terpenes in the product. Combined, the mixture of terpenes in the primary terpene forms at least 20% by weight of the total amount of terpenes in the product, at least 30%, at least 40%, at least 50%, at least 60%, at least 70% or at least 80%.

According to another embodiment, the product comprises at least three secondary terpenes, at least four, at least five or at least six, each one of which forms at least 0.00001% of the product and less than 10% by weight of the total amount of terpenes in the composition, less than 15%, less than 10%, less than 5%, less than 2% or even less than 1%.

According to an embodiment, there is provided a terpene-enriched composition for treating conditions and/or symptoms associated therewith in a male subject, which composition comprises
(i) at least one cannabinoid in a specific amount,
(ii) at least a first terpene in a specific amount,
(iii) at least 5% by weight of a non-cannabinoid, non-terpene carrier,
(iv) optionally at least three secondary terpenes; and
(a) wherein said non-cannabinoid, non-terpene carrier comprises cellulose and a weight/weight ratio of a total amount of terpenes to a total amount of cannabinoids in the composition is from about 0.1:1 to about 1:1, or;
(b) wherein said non-cannabinoid, non-terpene carrier comprises less than 5% by weight cellulose and a weight/weight ratio of a total amount of terpenes to a total amount of cannabinoids in the composition is about 0.05 to about 1.0.

According to some embodiments, the composition further comprises at least a second terpene, wherein the at least a first terpene is present at a concentration of at least 20% of the total amount of said at least a first terpene and said at least a second terpene; and wherein said at least a second terpene is present at a concentration of less than 10% of the total amount of said at least a first terpene and said at least a second terpene.

As used herein, "terpenes/cannabinoids (or terpenes to cannabinoids) weight/weight ratio" means the weight ratio between the combined amount of terpenes and the combined amount of cannabinoids. The combined amount of terpenes consists of the total amount of terpenes, including primary and secondary terpenes wherein secondary terpenes are present. According to an embodiment, the non-cannabinoid, non-terpene carrier comprises cellulose and the weight/weight ratio of the total amount of terpenes to the total amount of cannabinoids in the composition is from about 0.1:1 to about 1:1. According to an embodiment said non-cannabinoid, non-terpene, carrier comprises at least 5% by weight cellulose, at least 6%, at least 8%, at least 10%, at least 15%, or at least 20%. According to an embodiment, the ratio is greater than 0.1:1, greater than 0.15:1, greater than 0.2:1, greater than 0.25:1, greater than 0.3:1, greater than 0.35:1, greater than 0.4:1, greater than 0.45:1, greater than 0.5:1, greater than 0.55:1, greater than 0.6:1, greater than 0.65:1, greater than 0.7:1, greater than 0.75:1, greater than 0.8:1, greater than 0.85:1, greater than 0.9:1, greater than 0.95:1, greater than 1:1, greater than 1.2:1, greater than 15:1, greater than 2.0:1, greater than 3:1 or greater than 5:1. According to an embodiment, the ratio is less than 0.9:1, less than 0.8:1, less than 0.7:1, less than 0.6:1, less than 0.5:1, less than 0.4:1, less than 0.3:1, less than 0.2:1 or less than 0.15:1. According to an embodiment, the composition comprising more than 5% cellulose is selected from the group consisting of *Cannabis* plant material, e.g. *Cannabis* buds or *Cannabis* trim, ground forms thereof, plant material preparation for vaporizers and *Cannabis* cigarette.

According to another embodiment, the non-cannabinoid, non-terpene carrier comprises less than 5% by weight cellulose and the weight/weight ratio of the total amount of terpenes to the total amount of cannabinoids in the composition is in the range of between about 0.05:1 and about 1.0:1. According to an embodiment said non-cannabinoid, non-terpene, carrier comprises less than 5% by weight cellulose, less than 4%, less than 3%, less than 2%, or less than 1% cellulose. According to an embodiment, the ratio is greater than 0.1:1, greater than 0.15:1, greater than 0.2:1, greater than 0.25:1, greater than 0.3:1, greater than 0.35:1, greater than 0.4:1, greater than 0.45:1, greater than 0.5:1, greater than 0.55:1, greater than 0.6:1, greater than 0.65:1, greater than 0.7:1, greater than 0.75:1, greater than 0.8:1, greater than 0.85:1, greater than 0.9:1, greater than 0.95:1, greater than 1:1, greater than 1.2:1, greater than 15:1, greater than 2.0:1, greater than 3:1 or greater than 5:1. According to an embodiment, the ratio is less than 0.9:1, less than 0.8:1, less than 0.7:1, less than 0.6:1, less than 0.5:1, less than 0.9:1, less than 0.3:1, less than 0.2:1, less than 0.15:1 or less than 0.1:1. According to an embodiment, the composition comprising less than 5% cellulose is selected from the group consisting of *Cannabis* trichomes, *Cannabis* extracts and compositions thereof, such as tablets, gel capsules, medical patches, topicals, creams, varnishes, sublingual oils, sprays, edibles, suppositories, rectal candles, compositions, cigarettes, vaporizer liquids, nasal preparations, preparations containing micro and nano-emulsions, preparations containing micro and nano-particles and combinations thereof.

According to an embodiment, the primary terpene, the at least three secondary terpenes or both are selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol, isomers thereof and combinations thereof. According to an embodiment, the primary terpene the at least three secondary terpenes or both, are selected from the group consisting of pinene, limonene, linalool, caryophyllene, myrcene, terpineol, eucalyptol, geraniol and combinations thereof. According to an embodiment, the primary terpene the at least three secondary terpenes or both, are selected from the group consisting of pinene, limonene, linalool, caryophyllene, myrcene, eucalyptol and combinations thereof. According to an embodiment, at least one of the terpenes (primary or secondary, if present) is acyclic. According to an embodiment, at least one of the terpenes (primary or secondary, if present) is cyclic. According to an embodiment, at least one of the terpenes (primary or secondary, if present) is not found in *Cannabis* buds or is present there at less than 0.2%, less than 0.1%, less than 0.05% or less than 0.02%. Such terpene is referred to as "non-*Cannabis* terpene". According to an embodiment, the terpene-enriched cannabinoid composition comprises the non-*Cannabis* terpene at a concentration of at least 0.2%, at least 0.5%, least 0.8%, at least 1%, least 1.5%, at least 2%, at least 3%, least 4%, at least 5%, at least 8% or at least 12%.

According to an embodiment, the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof. According to an embodiment, the primary terpene is selected from the group consisting of pinene, limonene, linalool, caryophyllene, myrcene, terpineol, eucalyptol, geraniol and combinations thereof. According to an embodiment, the primary terpene is selected from the group consisting of pinene, limonene, linalool, caryophyllene, myrcene, eucalyptol and combinations thereof. According to an embodiment, the primary terpene is a non-*Cannabis* terpene.

According to an embodiment, the terpenes (primary or secondary, if present) comprise at least one monoterpene selected from the group consisting of limonene, myrcene, pinene, linalool, geraniol, terpinene camphene and isomers thereof. According to an embodiment, the terpenes (primary or secondary, if present) comprise at least one sesquiterpene selected from the group consisting of nerolidol, caryophyllene, farnesene, zingiberene, vetivazulene, guaiazulene, longifolene, copaene, patchoulol humulene and isomers thereof. According to an embodiment, the terpenes (primary or secondary, if present) comprise at least one diterpene selected from the group consisting of phytol, retinal, retinol, phytane, cembrene, sclarene, labdane, abietane, texadiene, stemarene, stemoden and isomers thereof. According to an embodiment, the terpenes (primary or secondary, if present) comprise at least one hydroxy-terpene selected from the group consisting of nerolidol, geraniol, linalool, phytol and isomers thereof. As used herein "hydroxy-terpene" refers to a terpene carrying a hydroxyl function.

According to an embodiment, at least one of the terpenes (primary or secondary, if present) is a monoterpene, at least one of the terpenes is a sesquiterpene and the monoterpenes to sesquiterpenes weight/weight ratio (i.e. the weight ratio between the total amount of monoterpenes and the total amount of the sesquiterpenes) is greater than 1.5:1 greater than 2:1, greater than 2.5:1, greater than 3:1, greater than 3-5:1, greater than 4:1, greater than 4-5:1, greater than 5:1, greater than 6:1, greater than 7:1, greater than 8:1, greater than 9:1, greater than 10:1, greater than 15:1, or greater than 20:1.

According to an embodiment, at least one of the terpenes (primary or secondary, if present) is a monoterpene, at least one of the terpenes (primary or secondary, if present) is a diterpene and the monoterpenes to diterpenes weight/weight ratio (i.e. the weight ratio between the total amount of monoterpenes and the total amount of the diterpenes) is greater than 5:1, greater than 6:1, greater than 7:1, greater than 8:1, greater than 9:1, greater than 10:1, greater than 12:1, greater than 14:1, greater than 16:1, greater than 18:1, greater than 20:1, greater than 25:1, or greater than 30:1.

According to an embodiment, at least one of the terpenes (primary or secondary, if present) carries no hydroxyl group, at least one of the terpenes carries hydroxyl group and the non-hydroxy-terpenes to hydroxyl-terpenes weight/weight ratio (i.e. the weight ratio between the total amount of non-hydroxy-terpenes and the total amount of the hydroxy-terpenes) is greater than 1.5:1, greater than 2:1, greater than 2.5:1, greater than 3:1, greater than 3-5:1, greater than 4:1, greater than 4-5:1, greater than 5:1, greater than 6:1, greater than 7:1, greater than 8:1, greater than 9:1, greater than 10:1, greater than 15:1, or greater than 20:1.

According to an embodiment, terpenes (primary or secondary, if present) form at least 0.5% by weight of the composition, at least 1%, at least 2%, at least 3%, at least 5%, at least 10%, at least 20%, at least 30%, at least 40%, at least 50%, at least 60% or at least 70%.

According to an embodiment, the composition is liquid at 30° C. According to an embodiment, the composition is a suspension at 30° C. According to an embodiment, the composition is essentially clear of haze or suspended solids at 30° C.

According to an embodiment, the composition comprises Cannabis plant material. According to an embodiment, the composition comprises Cannabis bud. According to an embodiment, the Cannabis bud forms at least 20% by weight of the composition, at least 30%, at least 40%, at least 50%, at least 60%, at least 70% or at least 80% by weight.

According to an embodiment, the non-cannabinoid, non-terpene carrier comprises cellulose, and the composition comprises (a) tetrahydrocannabinol (THC) and/or tetrahydrocannabinolic acid (THCa) in a total concentration of at least 5% by weight; (b) cannabidiol (CBD) and/or cannabidiolic acid (CBDa) in a total concentration of at least 5% by weight; (c) tetrahydrocannabinol (THC) and/or tetrahydrocannabinolic acid (THCa) in a total concentration of at least 2.5% by weight, and cannabidiol (CBD) and/or cannabidiolic acid (CBDa) in a total concentration of at least 2.5% by weight; or (d) at least one of cannabigerol (CBG), cannabinol (CBN), cannabichromene (CBC), and cannabicyclol (CBL), tetrahydrocannabivarin (THCV), cannabidivarin (CBDV), and non-decarboxylated form thereof in a concentration of at least 0.5% by weight; and (i) the primary terpene forms at least 40% by weight of the total terpene content, and (ii) the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to an embodiment, the non-cannabinoid, non-terpene, carrier comprises cellulose, and the composition comprises (a) tetrahydrocannabinol (THC) and/or tetrahydrocannabinolic acid (THCa) in a total concentration of at least 5% by weight; (b) cannabidiol (CBD) and/or cannabidiolic acid (CBDa) in a total concentration of at least 5% by weight; or (c) tetrahydrocannabinol (THC) and/or tetrahydrocannabinolic acid (THCa) in a total concentration of at least 2.5% by weight, and cannabidiol (CBD) and/or cannabidiolic acid (CBDa) in a total concentration of at least 2.5% by weight; and optionally (d) at least one of cannabigerol (CBG), cannabinol (CBN), cannabichromene (CBC), and cannabicyclol (CBL), tetrahydrocannabivarin (THCV), cannabidivarin (CBDV), and non-decarboxylated form thereof in a concentration of at least 0.5% by weight; wherein (i) the primary terpene forms at least 40% by weight of the total terpene content, and (ii) the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to a related embodiment, said non-cannabinoid, non-terpene, carrier comprises at least 5% by weight cellulose, at least 6%, at least 8%, at least 10%, at least 15%, or at least 20%.

According to a related embodiment, said tetrahydrocannabinol (THC) and/or tetrahydrocannabinolic acid (THCa) is in a total concentration of at least 4% by weight, at least 5%, at least 6%, at least 8%, at least 10%, at least 12%, at least 14%, at least 16%, at least 18%, or at least 20% by weight.

According to a related embodiment, said cannabidiol (CBD) and/or cannabidiolic acid (CBDa) is in a total concentration of at least 4% by weight, at least 5%, at least 6%, at least 8%, at least 10%, at least 12%, at least 14%, at least 16%, at least 18% or at least 20% by weight.

According to a related embodiment, said composition comprises tetrahydrocannabinol (THC) and/or tetrahydrocannabinolic acid (THCa) in a total concentration of at least 2.5% by weight, and cannabidiol (CBD) and/or cannabidiolic acid (CBDa) in a total concentration of at least 2.5% by weight; tetrahydrocannabinol (THC) and/or tetrahydrocannabinolic acid (THCa) in a total concentration of at least 3% by weight, and cannabidiol (CBD) and/or cannabidiolic acid (CBDa) in a total concentration of at least 3% by weight; tetrahydrocannabinol (THC) and/or tetrahydrocannabinolic acid (THCa) in a total concentration of at least 4% by weight, and cannabidiol (CBD) and/or cannabidiolic acid (CBDa) in a total concentration of at least 4% by weight; tetrahydrocannabinol (THC) and/or tetrahydrocannabinolic acid (THCa) in a total concentration of at least 5% by weight, and cannabidiol (CBD) and/or cannabidiolic acid (CBDa) in a total concentration of at least 5% by weight; tetrahydrocannabinol (THC) and/or tetrahydrocannabinolic acid (THCa) in a total concentration of at least 8% by weight, and cannabidiol (CBD) and/or cannabidiolic acid (CBDa) in a total concentration of at least 8% by weight; tetrahydrocannabinol (THC) and/or tetrahydrocannabinolic acid (THCa) in a total concentration of at least 10% by weight, and cannabidiol (CBD) and/or cannabidiolic acid (CBDa) in a total concentration of at least 10% by weight.

According to a related embodiment, said composition comprises cannabigerol (CBG) and/or cannabigerol acid (CBGa) in a total concentration of at least 0.1% by weight, at least 0.5%, at least 1%, at least 2%, at least 3%, at least 4%, or at least 5% by weight. According to a related embodiment, said composition comprises cannabinol (CBN) and/or cannabinol acid (CBNa) in a total concentration of at least 0.1% by weight, at least 0.5%, at least 1%, at least 2%, at least 3%, at least 4%, or at least 5% by weight. According to a related embodiment, said composition comprises cannabichromene (CBC) and/or cannabichromenic acid (CBCa) in a total concentration of at least 0.1% by weight, at least 0.5%, at least 1%, at least 2%, at least 3%, at least 4%, or at least 5% by weight. According to a related embodiment, said composition comprises cannabicyclol (CBL) and/or cannabicyclol acid (CBLa) in a total concentration at least 0.1% by weight, at least 0.5%, at least 1%, at least 2%, at least 3%, at least 4%, or at least 5% by weight. According to a related embodiment, said composition comprises tetrahydrocannabivarin (THCV), and/or tetrahydrocannabivarin acid (THCVA) in a total concentration at least 0.1% by weight, at least 0.5%, at least 1%, at least 2%, at least 3%, at least 4%, or at least 5% by weight. According to a related embodiment, said composition comprises cannabidivarin (CBDV) and/or cannabigerovarin acid (CBGVA) in a total concentration at least 0.1% by weight, at least 0.5%, at least 1%, at least 2%, at least 3%, at least 4%, or at least 5% by weight.

According to a related embodiment, said primary terpene forms at least 20% by weight of the total terpene content, at least 30%, at least 40%, at least 50%, at least 60%, at least 70%, at least 80% or at least 90% by weight of the total terpene content. According to a related embodiment, said primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof. According to a related embodiment, said composition comprises a dried *Cannabis* plant material. According to a related embodiment, said composition comprises ground *Cannabis* plant material, is a vaporizer *Cannabis* filling material or is a *Cannabis* cigarette.

According to an embodiment, the composition comprises (a) at least one cannabinoid selected from the group consisting of THC, CBD, CBG, CBC, CBN, CBL THCV, CBDV and their non-decarboxylated form thereof; (b) a non-cannabinoid, non-terpene carrier, comprising less than 5% by weight cellulose; (c) a primary terpene, forming at least 40% by weight of the total terpene content, wherein the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to a related embodiment, said THC and/or THCa is present in the composition in a total concentration of at least 1% by weight, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBD and/or CBDa is present in a total concentration of at least 1% by weight, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBG and/or CBGa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBC and/or CBCa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBN and/or CBNa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBL and/or CBLa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said THCV and/or THCVa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBDV and/or CBDVa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said non-cannabinoid non-terpene carrier comprises less than 5% by weight cellulose, less than 4%, less than 3%, less than 2%, or less than 1%, or less than 0.5% by weight cellulose.

According to a related embodiment, said primary terpene forms at least 20% by weight of the total terpene content, at least 30%, at least 40%, at least 50%, at least 60%, at least 70%, at least 80% or at least 90% by weight of the total terpene content. According to a related embodiment, said primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof. According to an embodiment, said composition is in the form of a liquid. According to an embodiment, said composition is provided in a delivery form selected from the group consisting of tablets, gel capsules, medical patches, topicals, creams, varnish, sublingual oil, sprays, edibles,

*Cannabis* candies, *Cannabis* drinks, *Cannabis* baked compositions, suppositories, rectal candle, cigarettes, vaporizer liquid, nasal preparations, preparations containing micro and nano-emulsions, preparations containing micro and nano-particles and combinations thereof.

According to an embodiment, the composition comprises less than 5% by weight glycol, less than 4%, less than 3%, less than 2%, or less than 1%, by weight glycol. As used herein, the term "glycol" refers to any glycol, including ethylene glycol, polyethylene glycol, propylene glycol and polypropylene glycol.

According to an embodiment, the composition comprises water at a concentration of less than 30% by weight, less than 25%, less than 20%, less than 15%, less than 12%, less than 10%, or less than 8% by weight of the composition. According to an embodiment, the water concentration is at least 1% by weight, at least 2%, at least 3%, at least 4% or at least 5% by weight of the composition.

According to an embodiment, the composition comprises chlorophyll. According to an embodiment, the composition comprises at least 0.5% by weight chlorophyll, at least 1, % at least 5%, at least 10%, at least 15%, at least 20% chlorophyll by weight of the composition. According to an embodiment, the composition comprises at least one flavonoid. According to an embodiment, the composition comprises at least two, at least three, at least four, or at least five flavonoids.

According to an embodiment, the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to an embodiment, the composition results in an increased therapeutic effect compared with that of a composition comprising a same specific cannabinoids amounts and a smaller amount of the primary terpene, e.g. one fifth, one quarter, one third or one half of that amount. According to various embodiment, the increased therapeutic effect has various forms, e.g. a shorter onset time of the therapeutic effect, an increased magnitude of the therapeutic effect, an extended duration of the therapeutic effect, a reduced requirement for the composition, a reduction in at least one secondary adverse symptom, a reduced frequency of at least one of said conditions and/or symptoms associated therewith, a reduced severity of conditions and/or symptoms associated therewith, a reduced consumption of other drugs and combinations thereof. According to an embodiment, the increased therapeutic effect comprises a shorter onset time, or differently put, an earlier effect, which is important particularly in cases of sublingual and topical delivery and in cases where a rapid effect is desired, as in treating pain. According to an embodiment, the increased therapeutic effect comprises extended duration of the therapeutic effect, for example an extended time of pain relief. According to an embodiment, the increased therapeutic effect comprises increased magnitude of the therapeutic effect, enabling achieving a desired therapeutic effect on administering smaller doses of cannabinoids, saving thereby on cost. According to an embodiment, the increased therapeutic effect comprises using smaller doses of cannabinoids and still achieving at least the same beneficial result.

According to an embodiment, the increased therapeutic effect comprises reduction of at least one secondary adverse symptom, e.g. adverse symptoms of the main condition, of symptoms of another condition and/or symptoms related to administering the composition or other drugs. According to an embodiment, the increased therapeutic effect comprises a reduced frequency of the conditions and/or symptoms associated therewith. According to an embodiment, the increased therapeutic effect comprises reduced severity of the conditions and/or symptoms associated therewith.

According to an embodiment, the primary terpene and the at least one cannabinoid are present in specific amounts, and the onset time of the therapeutic effect obtained by administering the composition, as measured by methods known in the art, is at least 20% shorter than that obtained of a by administering a composition comprising a same specific cannabinoids amounts and one fifth the amount of the primary terpene, at least 30%, at least 40%, at least 50%, at least 60%, or at least 70% shorter. According to an embodiment, the primary terpene, at least three secondary terpenes and the at least one cannabinoid are present in specific amounts, and the onset time of the therapeutic effect obtained by administering the composition is at least 20% shorter than that obtained by administering a composition comprising a same specific cannabinoids amounts, same secondary terpene amounts and one fifth the amount of the primary terpene, at least 30%, at least 40%, at least 50%, at least 60%, or at least 70% shorter. Shorter onset time, or differently put, an earlier effect, is important particularly in cases of sublingual and topical delivery and in cases where a rapid effect is desired, as in treating pain.

According to an embodiment, the primary terpene and the at least one cannabinoid are present in specific amounts, and the onset time of the therapeutic effect obtained by administering the composition is at least 20% longer than that obtained by administering a composition comprising a same specific cannabinoids amounts and one fifth the amount of the primary terpene, at least 30%, at least 40%, at least 50%, at least 60%, or at least 70% longer. According to an embodiment, the primary terpene, at least three secondary terpenes and the at least one cannabinoid are present in specific amounts, and the onset time of the therapeutic effect obtained by administering the composition is at least 20% longer than that of a composition comprising a same specific cannabinoids amounts, same secondary terpene amounts and one fifth the amount of the primary terpene, at least 30%, at least 40%, at least 50%, at least 60%, or at least 70% longer. According to an embodiment, compositions of delayed onset time are used in combination with shorter onset time to reach a sustained release effect.

According to an embodiment, the primary terpene and the at least one cannabinoid are present in specific amounts, and the magnitude of the therapeutic effect obtained by administering the composition, as measured by methods known in the art, is at least 20% greater compared with that obtained by administering a composition comprising a same specific cannabinoids amounts and one fifth the amount of the primary terpene, at least 30%, at least 40%, at least 50%, at least 60%, or at least 70% greater. According to an embodiment, the primary terpene, at least three secondary terpenes and the at least one cannabinoid are present in specific amounts, and the magnitude of the therapeutic effect obtained by administering the composition is at least 20% greater than that obtained by administering a composition comprising a same specific cannabinoids amounts, same secondary terpene amounts and one fifth the amount of the primary terpene, at least 30%, at least 40%, at least 50%, at least 60%, or at least 70% greater. Without wishing to be limited by any particular theory, such increased magnitude of the therapeutic effect may indicate increased bioavailability. Such increased magnitude enables achieving a desired therapeutic effect on administering smaller doses of cannabinoids, saving thereby on cost.

According to an embodiment, the primary terpene and the at least one cannabinoid are present in specific amounts, and the duration of the therapeutic effect obtained by administering the composition, as measured by methods known in the art, is at least 20% longer compared with that obtained by administering a composition comprising a same specific cannabinoids amounts and one fifth the amount of the primary terpene, at least 30%, at least 40%, at least 50%, at least 60%, at least 70%, at least 80%, at least 90% or at least 100% longer. According to an embodiment, the primary terpene, at least three secondary terpenes and the at least one cannabinoid are present in specific amounts, and the duration of the therapeutic effect obtained by administering the composition is at least 20% longer than that obtained by administering a composition comprising a same specific cannabinoids amounts, same secondary terpene amounts and one fifth the amount of the primary terpene, at least 30%, at least 40%, at least 50%, at least 60%, at least 70%, at least 80%, at least 90% or at least 100% longer.

According to an embodiment, the primary terpene and the at least one cannabinoid are present in specific amounts, and the frequency of the conditions and/or symptoms obtained by administering the composition, as measured by methods known in the art, is at least 20% smaller compared with that obtained by administering a composition comprising a same specific cannabinoids amounts and one fifth the amount of the primary terpene, at least 30%, at least 40%, at least 50% at least 60%, at least 70%, at least 80%, or at least 90% smaller. According to an embodiment, the primary terpene, at least three secondary terpenes and the at least one cannabinoid are present in specific amounts, and the frequency of the conditions and/or symptoms obtained by administering the composition, as measured by methods known in the art, is at least 20% smaller than that obtained by administering a composition comprising a same specific cannabinoids amounts, same secondary terpene amounts and one fifth the amount of the primary terpene, at least 30%, at least 40%, at least 50%, at least 60%, at least 70%, at least 80%, at least 90% or at least 100% longer.

According to an embodiment, the primary terpene and the at least one cannabinoid are present in specific amounts, and the severity of the conditions and/or symptoms obtained by administering the condition, as measured by methods known in the art, is at least 20% smaller compared with that obtained by administering a composition comprising a same specific cannabinoids amounts and one fifth the amount of the primary terpene, at least 30%, at least 40%, at least 50% at least 60%, at least 70%, at least 80%, or at least 90% smaller. According to an embodiment, the primary terpene, at least three secondary terpenes and the at least one cannabinoid are present in specific amounts, and the severity of the conditions and/or symptoms obtained by administering the composition, as measured by methods known in the art, is at least 20% smaller than that obtained by administering a composition comprising a same specific cannabinoids amounts, same secondary terpene amounts and one fifth the amount of the primary terpene, at least 30%, at least 40%, at least 50%, at least 60%, at least 70%, at least 80%, at least 90% or at least 100% smaller.

According to an embodiment, the primary terpene and the at least one cannabinoid are present in specific amounts, and the consumption of other drugs following administering the composition is reduced by at least 20% compared with that following administering a composition comprising a same specific cannabinoids amounts and one fifth the amount of said primary terpene, reduced by at least 30%, by at least 40%, by at least 50%, by at least 60%, by at least 70%, by at least 80%, or by at least 90%. According to an embodiment, the primary terpene, at least three secondary terpenes and the at least one cannabinoid are present in specific amounts, and the consumption of other drugs following administering the composition, as measured by methods known in the art, is reduced by at least 20% compared with that following administering of a composition comprising a same specific cannabinoids amounts, same secondary terpene amounts and one fifth the amount of the primary terpene, reduced by at least 30%, by at least 40%, by at least 50%, by at least 60%, by at least 70%, by at least 80%, or by at least 90%.

According to an embodiment, the therapeutic effect is generated while administering the composition in a vaporizer. According to an embodiment, the therapeutic effect is generated while administering the composition by inhaling. According to an embodiment, the therapeutic effect is generated while administering the composition by smoking. According to an embodiment, the therapeutic effect is generated while administering the composition sublingually. According to an embodiment, the therapeutic effect is generated while applying the composition, topically. According to an embodiment, the therapeutic effect is generated while administering the composition in suppositories, including rectal candles. According to an embodiment, the therapeutic effect is generated while administering the composition in a spray. According to an embodiment, the therapeutic effect is generated while administering the composition as an edible, as a candy, as baked good, as a drink. According to an embodiment, the therapeutic effect is generated while administering the composition as vaporizer liquid nasal preparation. According to an embodiment, the therapeutic effect is generated while administering the composition as micro and nano-emulsions. According to an embodiment, the therapeutic effect is generated while administering the composition as micro and nano-emulsions.

According to an embodiment said therapeutic effect treats symptoms and/or conditions associated with prostate abnormality and said composition comprises at least one of CBD, THC, CBC, CBG, CBN, CBL, THCV and CBDV. According to an embodiment said therapeutic effect treats symptoms and/or conditions associated with prostate abnormality and said composition comprises CBD and optionally THC at CBD to THC weight/weight ratio greater than 1:1, greater than 2:1, greater than 3:1, greater than 4:1 or greater than 5:1. According to an embodiment said therapeutic effect treats symptoms and/or conditions associated with prostate abnormality and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise prostate abnormality and said at least one primary terpene is selected from the group consisting of thujone, pinene, limonene, cymene, caryophyllene, caryophyllene oxide, eucalyptol, terpineol, sabinene, linalool, cardinol, carene, geraniol, camphor, viridiflorol, germacrene, citronellol, myrtenol, santalol and combinations thereof. According to an embodiment, the composition comprises at least 2 of these primary terpenes, at least 3, at least 4, or at least 5 of the primary terpenes. According to an embodiment, the primary terpene is selected from the group consisting of limonene, eucalyptol, linalool and combinations thereof. According to an embodiment, the primary terpene is selected from the group consisting of limonene, pinene, linalool and combinations thereof. According to an embodiment, the primary terpene is selected from the group consisting of linalool, geraniol, pinene and combinations thereof. According to various embodiments said primary terpene comprises thujone, limonene, cymene, caryophyllene, caryophyllene oxide, eucalyptol, terpineol, sabinene, cardinol, carene, geraniol, camphor, viridiflorol, germacrene, citronellol, myrtenol and/or santalol. According to an embodiment, said conditions and/or symptoms associated therewith comprise a prostate abnormality and the composition further comprises a compound selected from the group consisting of zincum metallicum, omega 3, genistein, daidzein, glycitein and combinations thereof. According to an embodiment, said conditions and/or symptoms associated therewith comprise a prostate abnormality and the composition further comprises a herbal extract selected from the group consisting of extracts of *Althea officinalis, andrographis paniculata, Anemarrhenae asphodeloides, Apium graveolens, Arctostaphylos uva-ursi, Barosma betulina, Coptis chinensis, Echinacea* spp, *Hydrastis canadensis, Plantago* spp, *Uncaria tomentosa, Zea mays, Serenoa serrulate, Urtica dioica, Pigeum africanum, Opuntia ficus indica, Ganoderma lucidum, Silybum marinum* and combinations thereof.

According to an embodiment said conditions and/or symptoms associated therewith comprise prostate cancer and said composition comprises at least one of CBD, THC, CBC, CBG, CBN, CBL, THCV and CBDV. According to an embodiment said conditions and/or symptoms associated therewith comprise prostate cancer and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise prostate cancer and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise prostate cancer and said primary terpene is selected from the group consisting of myrcene, pinene, limonene, caryophyllene, caryophyllene oxide, terpinene, citronellol, linalool, humulene, amyrin, cycloartenol and combinations thereof. According to an embodiment, the composition comprises at least 2 of these primary terpenes, at least 3, at least 4, or at least 5 of the primary terpenes. According to an embodiment, the primary terpene is selected from the group consisting of myrcene, limonene, caryophyllene and combinations thereof. According to an embodiment, the primary terpene is selected from the group consisting of limonene, caryophyllene, terpinene and combinations thereof. According to an embodiment, the primary terpene is selected from the group consisting of myrcene, limonene, caryophyllene, terpinene, citronellol and combinations thereof. According to various embodiments said primary terpene comprises myrcene, pinene, caryophyllene, caryophyllene oxide, terpinene, citronellol, linalool, humulene, amyrin and/or cycloartenol. According to an embodiment said conditions and/or symptoms associated therewith comprise prostate cancer and the composition further comprises a compound selected from the group consisting of lycopene, curcumin, epigallocatechin gallate, omega 3, capsaicin, selenium, vitamin D, allicin and combinations thereof. According to an embodiment said conditions and/or symptoms associated therewith comprise prostate cancer and the composition further comprises a herbal extract selected from the group consisting of extracts of *Serenoa serrulate, Camellia sinensis, Silybum marinum, Tabebuia impestiginosa*, red clover, *Punica granatum, Zingiber officinalis, Ginseng* and combinations thereof.

According to an embodiment said conditions and/or symptoms associated therewith comprise male infertility and said composition comprises at least one of CBD, THC, CBC, CBG, CBN, CBL, THCV and CBDV. According to an embodiment said conditions and/or symptoms associated therewith comprise male infertility and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise male infertility and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise male infertility and said primary terpene is selected from the group consisting of citronellol, geraniol, nerol, farnesol, eucalyptol, sabinene, caryophyllene, pinene, limonene, santalol, linalool, terpineol, terpinene and combinations thereof. According to an embodiment, the composition comprises at least 2 of these terpenes, at least 3, at least 4, or at least 5 of the terpenes. According to an embodiment, the primary terpene is selected from the group consisting of pinene, linalool, ecualyptol and combinations thereof. According to various embodiments said primary terpene comprises citronellol, geraniol, nerol, farnesol, sabinene, caryophyllene, limonene, santalol, terpineol and/or terpinene. According to an embodiment, said conditions and/or symptoms associated therewith comprise male infertility and the composition further comprises a compound selected from the group consisting of phenyl acetonitrile, zincum metallicum, omega 3 and combinations thereof. According to an embodiment, said conditions and/or symptoms associated therewith comprise male infertility and the composition further comprises a herbal extract selected from the group consisting of extracts of *Lepidium meyenii, Panax Ginseng, Serenoa serrulata, Withania somnifera, Lycium barbarum, Ginseng, Epimedium grandiflorum, Turnera diffusa Vitex agnus castus, Withania somnifera, Ginseng, Eucommia ulmoides, Tribulus terrestris, Psoralea drupaceae, Alpinia galanga, Alpinia officinarum, Boesenbergia rotunda, Kaempferia galanga* and combination thereof.

According to an embodiment said conditions and/or symptoms associated therewith comprise reduced libido and/or sexual dysfunction and said composition comprises at least one of CBD, THC, CBC, CBG, CBN, CBL, THCV and CBDV. According to an embodiment said conditions and/or symptoms associated therewith comprise reduced libido and/or sexual dysfunction and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise reduced libido and/or sexual dysfunction and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment, said conditions and/or symptoms associated therewith comprise reduced libido and/or sexual dysfunction and said primary terpene is selected from the group consisting of limonene, linalool, terpineol, geraniol, eucalyptol, pinene, citronellol and combinations thereof. According to an embodiment, the composition comprises at least 2 of these terpenes, at least 3, at least 4, or at least 5 of the terpenes. According to an embodiment, the primary terpene is selected from the group consisting of limonene, linalool, ecualyptol and combinations thereof. According to various embodiments said primary terpene comprises terpineol, geraniol and/or pinene. According to an embodiment, said conditions and/or symptoms associated therewith comprise reduced libido and/or sexual dysfunction and the composition further comprises a compound selected from the group consisting of phenyl acetonitrile, zincum metallicum, omega 3 and combinations thereof. According to an embodiment, said conditions and/or symptoms associated therewith comprise reduced libido and/or sexual dysfunction and the composition further comprises a herbal extract selected from the group consisting of extracts of *Epimedium grandiflorum, Ganoderma lucidum, Lepidium meyenii, Turnera diffusa, Vitex agnus castus, Withania somnifera, Ginseng, Eucommia ulmoides, Tribulus terrestris, Psoralea drupaceae, Alpinia galanga, Alpinia officinarum, Boesenbergia rotunda, Kaempferia galanga* and combinations thereof.

According to an embodiment said conditions and/or symptoms associated therewith comprise hair loss and/or hair thinning and said composition comprises at least one of CBD, THC, CBC, CBG, CBN, CBL, THCV and CBDV. According to an embodiment said conditions and/or symptoms associated therewith comprise hair loss and/or hair thinning and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise hair loss and/or hair thinning and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise hair loss and/or hair thinning and said primary terpene is selected from the group consisting of linalool, terpineol, eucalyptol, borneol, camphor, pinene, geraniol and combinations thereof. According to an embodiment, the composition comprises at least 2 of these terpenes, at least 3, at least 4, or at least 5 of the terpenes. According to an embodiment, the primary terpene is selected from the group consisting of geraniol, eucalyptol, terpineol and combinations thereof. According to various embodiments said primary terpene comprises linalool, borneol, camphor and/or pinene. According to an embodiment, said conditions and/or symptoms associated therewith comprise hair loss and/or hair thinning and the composition further comprises a herbal extract selected from the group consisting of extracts of *Rehmania glutinosa preparata, Rosmarinus officinalis, Serenoa serrulata, Urtica dioica* and combinations thereof.

According to an embodiment said conditions and/or symptoms associated therewith comprise irregular body odor and said composition comprises at least one of CBD, THC, CBC, CBG, CBN, CBL, THCV and CBDV. According to an embodiment said conditions and/or symptoms associated therewith comprise irregular body odor and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise irregular body odor and said composition comprises THC and optionally CBD at THC to CBD weight/weight ratio greater than 0.9:1, greater than 2:1, greater than 3:1, greater than 4:1 or greater than :15. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise irregular body odor and said primary terpene is selected from the group consisting of linalool, terpineol, geraniol, eucalyptol and combinations thereof. According to an embodiment, the composition comprises at least 2 of these terpenes, at least 3, or all 4 of the terpenes. According to an embodiment, the primary terpene is selected from the group consisting of linalool, terpineol, geraniol and combinations thereof.

According to an embodiment said conditions and/or symptoms associated therewith comprise partial androgen deficiency of the ageing male (PADAM) and/or andropause and said composition comprises at least one of CBD, THC, CBC, CBG, CBN, CBL, THCV and CBDV. According to an embodiment said conditions and/or symptoms associated therewith comprise partial androgen deficiency of the ageing male (PADAM) and/or andropause and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise partial androgen deficiency of the ageing male (PADAM) and/or andropause and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise partial androgen deficiency of the ageing male (PADAM) and/or andropause and said primary terpene is selected from the group consisting of caryophyllene, caryophyllene oxide, carene, linalool, myrcene, terpinene, terpineol, citronellol, eucalyptol, nerolidol, limonene, geraniol, menthol, iso-menthone, germacrene, pinene, cardinol, neral, geranial, menth-2-en-1-ol, bisabolol, phytol, pulegone, cymene, fenchol, humulene, guaiol, borneol, carene, sabinene, myrtenol, camphene, nerol, farnesol, carotol and combinations thereof. According to an embodiment, the composition comprises at least 2 of these primary terpenes, at least 3, at least 4, or at least 5 of the primary terpenes. According to an embodiment, the primary terpene is selected from the group consisting of caryophyllene, linalool, carene and combinations thereof. According to an embodiment, the primary terpene is selected from the group consisting of caryophyllene, linalool, myrcene and combinations thereof. According to an embodiment, the primary terpene is selected from the group consisting of nerolidol, limonene, linalool and combinations thereof. According to an embodiment, the primary terpene is selected from the group consisting of caryophyllene, linalool, carene, nerolidol, limonene and combinations thereof. According to various embodiments said primary terpene comprises caryophyllene, caryophyllene oxide, carene, myrcene, terpinene, terpineol, citronellol, eucalyptol, nerolidol, limonene, geraniol, menthol, iso-menthone, germacrene, pinene, cardinol, neral, geranial, menth-2-en-1-ol, pulegone, cymene, fenchol, humulene, guaiol, borneol, carene, sabinene, myrtenol, camphene, nerol, farnesol and/or carotol. According to an embodiment, said conditions and/or symptoms associated therewith comprise partial androgen deficiency of the ageing male (PADAM) and/or andropause and the composition further comprises a compound selected from the group consisting of drupanol, genistein, daidzein, glycitein and combinations thereof. According to an embodiment, said conditions and/or symptoms associated therewith comprise partial androgen deficiency of the ageing male (PADAM) and/or andropause and the composition further comprises a herbal extract selected from the group consisting of extracts of *Angelica sinensis, Anemarrhenae asphodeloides, Cimicifuga (actaea) Racemosa, Glycyrrhiza glabra. Hypericum perforatum, Panax quinquefolium, Trifolium pratense, Avena sativa, Cimicifuga (actaea) Racemosa, Humulus lupulus, Hypericum perforatum, Lavendula officinalis, Melissa officinalis, Passiflora incarnata, Valeriana officinalis, Eucommia ulmoides, Tribulus terrestris, Ginseng, Psoralea drupaceae, Alpinia galanga, Alpinia officinarum, Boesenbergia rotunda, Kaempferia galanga* and combinations thereof.

According to an embodiment said conditions and/or symptoms associated therewith comprise male urogenital and/or reproductive system infections and/or disorders and said composition comprises at least one of CBD, THC, CBC, CBG, CBN, CBL, THCV and CBDV. According to an embodiment said conditions and/or symptoms associated therewith comprise male urogenital and/or reproductive system infections and/or disorders and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise male urogenital and/or reproductive system infections and/or disorders and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise male urogenital and/or reproductive system infections and/or disorders and said primary terpene is selected from the group consisting of myrcene, humulene, caryophyllene, linalool, terpineol, geraniol, pinene, germacrene, citronellol, limonene, myrcene, terpinene, menth-2-en-1-ol, borneol, eucalyptol, myrtenol, cymene, caryophyllene oxide, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene, thujone and combinations thereof. According to an embodiment, the composition comprises at least 2 of these terpenes, at least 3, at least 4, or at least 5 of the terpenes. According to an embodiment, the primary terpene is selected from the group consisting of linalool, pinene, caryophyllene oxide and combinations thereof. According to an embodiment, the primary terpene is selected from the group consisting of geraniol, linalool, pinene, caryophyllene oxide and combinations thereof. According to various embodiments said at least one primary terpene comprises myrcene, humulene, caryophyllene, terpineol, geraniol, germacrene, citronellol, limonene, myrcene, terpinene, menth-2-en-1-ol, borneol, eucalyptol, myrtenol, cymene, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene and/or thujone. According to an embodiment, said conditions and/or symptoms associated therewith comprise male urogenital and/or reproductive system infections and/or disorders and the composition further comprises a herbal extract selected from the group consisting of extracts of *Apium graveolens, Dioscorea villosa spp, Althea officinalis, Anemarrhenae asphodeloides, Anemarrhenae asphodeloides, Apium graveolens, Arctostaphylos uva-ursi, Barosma betulina, Coptis chinensis, Echinacea spp, Equisitum arvense, Hydrastis canadensis, Plantago spp, Serenoa serrulata, Uncaria tomentosa, Urtica dioica, Viola tricolor, Zea mays* and combinations thereof.

According to an embodiment, the composition comprises an additive selected from the group consisting of antioxidants, emulsifiers and texturizers vegetable oils, plant extracts, honey, pharmaceutical excipients, sucrose, glucose and fructose, pharmaceutical excipients and combinations thereof. According to an embodiment, the composition comprises a surfactant selected from the group consisting of phospholipids, glycerides, glycolipids and combinations thereof. According to an embodiment, the composition further comprises a food-approved texturizer. According to an embodiment, the composition further comprises at least 10 ppm ethanol. According to an embodiment, the composition further comprises at least one of vitamin C, vitamin E, polyunsaturated fatty acids, beeswax and coconut oil. According to an embodiment, the composition further comprises a sweetener. According to an embodiment, the composition further comprises omega 3 fatty acid. According to an embodiment, the composition further comprises omega 6 fatty acid. According to an embodiment, the composition further comprises omega 3 fatty acid. According to an embodiment, the composition further comprises curcumin.

According to an embodiment, the terpene-enriched cannabinoid composition is for administration to a human subject. According to an embodiment, the terpene-enriched cannabinoid composition is for veterinary administration.

According to an embodiment, the shelf life of the composition is at least 6 months or at least a year. According to an embodiment, degradation of the primary terpene in the composition is less than 20% per year.

According to an embodiment, further provided is a product in a form selected from the group consisting of tablets, gel capsules, medical patches, topicals, creams, varnishes, sublingual oils, sprays, edibles, suppositories, rectal candle, cigarette, vaporizer liquid nasal preparations, preparations containing micro and nano-emulsions, preparations containing micro and nano-particles and combinations thereof, comprising the composition. According to an embodiment, further provided is a product comprising a tablet comprising the composition. According to an embodiment, further provided is a product comprising gel capsules comprising the composition. According to an embodiment, further provided is a product comprising medical patches comprising the composition. According to an embodiment, further provided is a product comprising the composition for topical administration. According to an embodiment, further provided is a product comprising a cream comprising the composition. According to an embodiment, further provided is a product comprising varnishes comprising the composition. According to an embodiment, further provided is a product comprising sublingual oils comprising the composition. According to an embodiment, further provided is an edible product comprising the composition. According to an embodiment, further provided is a product comprising rectal candles comprising the composition. According to an embodiment, further provided is a product comprising cigarettes comprising the composition. According to an embodiment, further provided is a product comprising vaporizer liquids comprising the composition.

According to an embodiment, further provided is a commercial product comprising two compositions according to the present invention, which two compositions differ in the content of the primary terpene. According to an embodiment, further provided is a commercial product comprising two compositions according to the present invention, which two compositions comprise a different primary terpenes.

According to an embodiment, further provided is a method for producing the composition comprising providing at least one cannabinoid and blending it with a primary terpene.

According to an embodiment, the providing at least one cannabinoid includes extracting Cannabis plant material to form an extract. According to an embodiment, the extract comprises at least one cannabinoid and at least one terpene. According to an embodiment the extracting comprises steam distillation. According to an embodiment, the method further comprises removing terpenes from the extract prior to the blending. According to an embodiment, the extracting comprises contacting a Cannabis plant material with an extractant to form an extract, which extract comprises at least one cannabinoid and the extractant; and optionally removing at least a fraction of the extractant from the extract. According to an embodiment, the extractant comprises at least one of ethanol, a liquefied gas, such as butane, butene or dimethyl-ether, liquefied $CO_2$, near-critical $CO_2$ supercritical $CO_2$ and combinations thereof. According to an embodiment, extracting comprises contacting the Cannabis plant material with an extractant to form an extract, and the extractant comprises at least one terpene. According to an embodiment, the extractant comprises the primary terpene.

According to an embodiment, the method further comprises at least partially decarboxylating the cannabinoid. According to an embodiment the decarboxylating is conducted at a temperature greater than 100° C. According to an embodiment the decarboxylating is conducted prior to extracting. According to an embodiment the decarboxylating is conducted on the extract prior to the blending with the primary terpene. According to an embodiment, a fraction of the extract is decarboxylated, and the decarboxylated fraction is blended with another fraction, which was not decarboxylated.

According to an embodiment, the method further comprises extracting a plant material, whereby the primary terpene is produced. According to an embodiment, the plant material is selected from the group including Cannabis, lemons, oranges, hops, lavender, pine needles, Echinacea, tea, clover, capsicum, eucalyptus, geranium and mint.

According to an embodiment, the method comprises synthesizing at least one cannabinoid and blending the synthesized cannabinoid with the primary terpene.

According to an embodiment, the method further comprises blending Cannabis plant material with a primary terpene. According to an embodiment, the Cannabis plant material comprises a Cannabis bud. According to an embodiment, the blending Cannabis plant material with a primary terpene comprises spraying the Cannabis plant material with the primary terpene, optionally in a solvent. According to an embodiment, the blending Cannabis plant material with a primary terpene comprises combining the Cannabis plant material with a substrate comprising the primary terpene. According to an embodiment, the substrate is a plant material sprayed with a primary terpene. According to an embodiment, the substrate is a cigarette paper sprayed with the primary terpene.

According to an embodiment, further provided is a method for producing the composition, comprising extracting Cannabis plant material to form an extract, wherein the extracting forms at least two extract fractions, a cannabinoid-enriched extract and a terpene-enriched extract. As used herein, the term "cannabinoid-enriched extract" refers to an extract wherein cannabinoid to terpenes weight/weight ratio is greater than that in the plant material.

As used herein, the term "terpene-enriched extract" refers to an extract wherein cannabinoid to terpenes weight/weight ratio is smaller than that in the plant material. According to an embodiment, the method comprises dividing the cannabinoid-enriched extract into at least two fractions and mixing at least one fraction with at least part of the terpene-enriched extract to form a terpene-enriched composition, wherein terpenes to cannabinoid weight/weight ratio is greater than that ratio in the Cannabis plant material. According to an embodiment the ratio is 1.5 times greater than that in the Cannabis plant material, 2 times greater, 2.5 times greater, 3 times greater, 4 times greater, 5 times greater, 6 times greater, 7 times greater, 8 times greater, or 10 times greater. According to an embodiment, the terpene-enriched composition is further mixed with at least one terpene.

According to an embodiment, further provided is a method for reaching, achieving and/or gaining a therapeutic effect in treating conditions and/or symptoms associated therewith selected from the group consisting of androgen deficiency, male infertility, male urogenital or reproductive system infections, the method comprising administering to a subject in need a therapeutically effective amount of a composition comprising (i) at least one cannabinoid in a specific amount, (ii) a primary terpene in a specific amount, (iii) at least 5% by weight of a non-cannabinoid, non-terpene, carrier; and (iv) optionally at least three secondary terpenes, optionally combined with at least one herbal extract. According to an embodiment, the composition is provided in a form selected from the group consisting of cigarettes, vaporizer plant material, vaporizer liquid, extract, tablets, gel capsules, suppositories, rectal candle, cigarette, vaporizer liquid nasal preparation, preparations containing micro and nano-emulsions, preparations containing micro and nano-particles and combinations thereof. According to an embodiment, the daily dose of the composition comprises about 1 milligram cannabinoid to about 300 milligram, about 2 milligram cannabinoids to about 200 milligrams or about 3 milligram cannabinoid to about 100 milligram. According to another embodiment, the daily dose of the composition comprises about 0.5 milligram cannabinoid per kilogram body weight to about 30 milligram cannabinoids per kilogram body weight.

According to an embodiment, the composition comprises at least two cannabinoids, at least three, at least four or at least five. According to an embodiment, the content of each cannabinoid in the composition is at least 10 parts per million (ppm). According to an embodiment, the cannabinoids are selected from the group consisting THC, CBD, CBG, CBC, CBN, CBL, THCV, CBDV and their non-decarboxylated form thereof.

According to an embodiment, the composition comprises at least 5% by weight carrier, at least 10%, at least 15%, at least 20%, at least 25%, at least 30%, at least 35% or at least 40% by weight. Any compound other than cannabinoids and terpenes is a suitable carrier. According to an embodiment, the carrier is selected from the group consisting of vegetable oils, e.g. coconut oil, olive oil or sesame oil, pharmaceutical excipients, honey, bees wax, cellulose and combinations thereof.

According to an embodiment, the composition comprises a primary terpene and optionally at least three secondary terpenes, at least four or at least five. According to an embodiment, the primary terpene forms at least 20% by weight of the total amount of terpenes in the composition, at least 30%, at least 40%, at least 50%, at least 60%, at least 70% or at least 80%. According to an embodiment, the composition comprises multiple (e.g. two or three) terpenes, each one of which forms at least 20% by weight of the total amount of terpenes in the composition and each one of these terpenes is considered a primary terpene. According to an embodiment, the content of the primary terpene in the composition is at least 2 times greater than that of any secondary terpene, at least 4, at least 6, at least 8, at least 10, at least 15, at least 20, at least 25, or at least 30 times greater.

According to an embodiment, the composition further comprises at least one herbal extract, at least two, at least three, at least four, or at least five herbal extracts.

According to an embodiment, the composition comprises less than 5% by weight glycol, less than 4%, less than 3%, less than 2%, or less than 1% by weight.

According to an embodiment, the composition comprises less than 20% by weight water, less than 15% by weight, less than 14%, less than 13%, less than 12%, less than 11% or less than 10% by weight.

According to a related embodiment, the composition comprises chlorophyll. According to an embodiment, the composition comprises at least 0.5% by weight chlorophyll, at least 1%, at least 5%, at least 10%, at least 15%, at least 20% chlorophyll. According to an embodiment, the composition comprises at least one flavonoid. According to an embodiment, the composition comprises at least two, at least three, at least four, or at least five flavonoids.

According to an embodiment, the non-cannabinoid, non-terpene carrier comprises cellulose and the weight/weight ratio of the total amount of terpenes to total amount of cannabinoids in the composition is from about 0.1:1 to about 1:1. According to an embodiment said non-cannabinoid, non-terpene, carrier comprises at least 5% by weight cellulose, at least 6%, at least 8%, at least 10%, at least 15%, or at least 20%. According to an embodiment, the weight/weight ratio of the total amount of terpenes to total amount of cannabinoids in the composition is greater than 0.1:1, greater than 0.15:1, greater than 0.2:1, greater than 0.25:1, greater than 0.3:1, greater than 0.35:1, greater than 0.4:1, greater than 0.45:1, greater than 0.5:1, greater than 0.55:1, greater than 0.6:1, greater than 0.65:1, greater than 0.7:1, greater than 0.75:1, greater than 0.8:1, greater than 0.85:1, greater than 0.9:1, greater than 0.95:1, greater than 1:1, greater than 1.2:1, greater than 1.5:1, greater than 2:1, greater than 3:1 or greater than 5:1. According to an embodiment, the weight/weight ratio of the total amount of terpenes to total amount of cannabinoids in the composition is less than 0.9:1, less than 0.8:1, less than 0.7:1, less than 0.6:1, less than 05:1, less than 0.4:1, less than 0.3:1, less than 0.2:1 or less than 0.15:1. According to an embodiment, the composition comprising more than 5% cellulose is selected from the group consisting of *Cannabis* plant material, e.g. *Cannabis* buds or *Cannabis* trim, ground forms thereof, plant material preparation for vaporizers and *Cannabis* cigarette.

According to an embodiment, the non-cannabinoid, non-terpene carrier comprises less than 5% by weight cellulose and the weight/weight ratio of the total amount of terpenes to total amount of cannabinoids in the composition in the composition is from about 0.05:1 to about 1:1. According to an embodiment, said non-cannabinoid, non-terpene, carrier comprises less than 5% by weight cellulose, less than 4%, less than 3%, less than 2%, or less than 1% cellulose. According to an embodiment, the weight/weight ratio of the total amount of terpenes to total amount of cannabinoids in the composition is greater than 0.1:1, greater than 0.15:1, greater than 0.2:1, greater than 0.25:1, greater than 0.3:1, greater than 0.35:1, greater than 0.4:1, greater than 0.45:1, greater than 0.5:1, greater than 0.55:1, greater than 0.6:1, greater than 0.65:1, greater than 0.7:1, greater than 0.75:1, greater than 0.8:1, greater than 0.85:1, greater than 0.9:1, greater than 0.95:1, greater than 1:1, greater than 1.2:1, greater than 1.5:1, greater than 2:1, greater than 3:1 or greater than 5:1. According to an embodiment, the weight/weight ratio of the total amount of terpenes to total amount of cannabinoids in the composition is less than 0.9:1, less than 0.8:1, less than 0.7:1, less than 0.6:1, less than 0.5:1, less than 0.4:1, less than 0.3:1, less than 0.2:1, less than 0.15:1 or less than 0.1:1. According to an embodiment, the composition comprising less than 5% cellulose is selected from the group consisting of *Cannabis* trichomes, *Cannabis* extracts and compositions thereof, in a form such as tablets, gel capsules, medical patches, vaporizer liquids and suppositories, rectal candle, cigarette, vaporizer liquid nasal preparation, preparations containing micro and nano-emulsions, preparations containing micro and nano-particles and combinations thereof.

According to an embodiment, the conditions and/or symptoms associated therewith partial comprising androgen deficiency of the ageing male (PADAM) and/or andropause are selected from the group consisting of prostate abnormality, prostate cancer, impaired and/or reduced fertility, hot flashes, sweating, fatigue, irritability, decreased physical and/or mental energy, memory loss, depression, anger anxiety, nervousness, restless, stress, mood swing, affect disorder, muscle tension, myalgia, decreased muscle mass, intermittent dizziness, weight gain, urinary incontinence, lower urinary tract disorders, male urogenital and/or reproductive system infection, reduced libido and/or sexual desire, sexual dysfunction, hair loss and/or hair thinning, irregular body odor, conditions and/or symptoms induced by androgen deficiency, conditions and/or symptoms associated with partial androgen deficiency of the ageing male (PADAM) and/or andropause and combinations thereof.

According to an embodiment, the composition further comprises an additive selected from the group consisting of antioxidants, emulsifiers and texturizers vegetable oils, plant extracts, honey, sucrose, glucose and fructose, pharmaceutical excipients and combinations thereof.

According to an embodiment, the non-cannabinoid, non-terpene, carrier comprises cellulose, and the composition comprises (a) tetrahydrocannabinol (THC) and/or tetrahydrocannabinolic acid (THCa) in a total concentration of at least 5% by weight of the composition; (b) cannabidiol (CBD) and/or cannabidiolic acid (CBDa) in a total concentration of at least 5% by weight of the composition; (c) tetrahydrocannabinol (THC) and/or tetrahydrocannabinolic acid (THCa) in a total concentration of at least 2.5% by weight of the composition, and cannabidiol (CBD) and/or cannabidiolic acid (CBDa) in a total concentration of at least 2.5% by weight of the composition; or (d) at least one of cannabigerol (CBG), cannabinol (CBN), cannabichromene (CBC), and cannabicyclol (CBL), tetrahydrocannabivarin (THCV), cannabidivarin (CBDV), and non-decarboxylated form thereof in a concentration of at least 0.5% by weight of the composition; and (i) the primary terpene forms at least 40% by weight of the total terpene content of the composition, and (ii) the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to a related embodiment said non-cannabinoid, non-terpene, carrier comprises at least 5% by weight cellulose, at least 6%, at least 8%, at least 10%, at least 15%, or at least 20%.

According to a related embodiment, said tetrahydrocannabinol (THC) and/or tetrahydrocannabinolic acid (THCa) is present in a total concentration of at least 4% by weight, at least 5%, at least 6%, at least 8%, at least 10%, at least 12%, at least 14%, at least 16%, at least 18%, or at least 20% by weight of the composition.

According to a related embodiment, said cannabidiol (CBD) and/or cannabidiolic acid (CBDa) is in a total concentration of at least 4% by weight, at least 5%, at least 6%, at least 8%, at least 10%, at least 12%, at least 14%, at least 16%, at least 18% or at least 20% by weight of the composition.

According to a related embodiment, said composition comprises tetrahydrocannabinol (THC) and/or tetrahydrocannabinolic acid (THCa) in a total concentration of at least 2.5% by weight, and cannabidiol (CBD) and/or cannabidiolic acid (CBDa) in a total concentration of at least 2.5% by weight; tetrahydrocannabinol (THC) and/or tetrahydrocannabinolic acid (THCa) in a total concentration of at least 3% by weight, and cannabidiol (CBD) and/or cannabidiolic acid (CBDa) in a total concentration of at least 3% by weight; tetrahydrocannabinol (THC) and/or tetrahydrocannabinolic acid (THCa) in a total concentration of at least 4% by weight, and cannabidiol (CBD) and/or cannabidiolic acid (CBDa) in a total concentration of at least 4% by weight; tetrahydrocannabinol (THC) and/or tetrahydrocannabinolic acid (THCa) in a total concentration of at least 5% by weight, and cannabidiol (CBD) and/or cannabidiolic acid (CBDa) in a total concentration of at least 5% by weight; tetrahydrocannabinol (THC) and/or tetrahydrocannabinolic acid (THCa) in a total concentration of at least 8% by weight, and cannabidiol (CBD) and/or cannabidiolic acid (CBDa) in a total concentration of at least 8% by weight; tetrahydrocannabinol (THC) and/or tetrahydrocannabinolic acid (THCa) in a total concentration of at least 10% by weight, and cannabidiol (CBD) and/or cannabidiolic acid (CBDa) in a total concentration of at least 10% by weight.

According to a related embodiment, said composition comprises cannabigerol (CBG) and/or cannabigerol acid (CBGa) in a total concentration of at least 0.1% by weight, at least 0.5%, at least 1%, at least 2%, at least 3%, at least 4%, or at least 5% by weight. According to a related embodiment, said composition comprises cannabinol (CBN) and/or cannabinol acid (CBNa) in a total concentration of at least 0.1% by weight, at least 0.5%, at least 1%, at least 2%, at least 3%, at least 4%, or at least 5% by weight. According to a related embodiment, said composition comprises cannabichromene (CBC) and/or cannabichromenic acid (CBCa) in a total concentration of at least 0.1% by weight, at least 0.5%, at least 1%, at least 2%, at least 3%, at least 4%, or at least 5% by weight. According to a related embodiment, said composition comprises cannabicyclol (CBL) and/or cannabicyclol acid (CBLa) in a total concentration at least 0.1% by weight, at least 0.5%, at least 1%, at least 2%, at least 3%, at least 4%, or at least 5% by weight. According to a related embodiment, said composition comprises tetrahydrocannabivarin (THCV), and/or tetrahydrocannabivarin acid (THCVA) in a total concentration at least 0.1% by weight, at least 0.5%, at least 1%, at least 2%, at least 3%, at least 4%, or at least 5% by weight. According to a related embodiment, said composition comprises cannabidivarin (CBDV) and/or cannabigerovarin acid (CBGVA) in a total concentration at least 0.1% by weight, at least 0.5%, at least 1%, at least 2%, at least 3%, at least 4%, or at least 5% by weight.

According to a related embodiment, said primary terpene forms at least 20% by weight of the total terpene content, at least 30%, at least 40%, at least 50%, at least 60%, at least 70%, at least 80% or at least 90% by weight of the total terpene content. According to a related embodiment, said primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof. According to a related embodiment, said composition comprises a dried *Cannabis* plant material. According to a related embodiment, said composition comprises ground *Cannabis* plant material, is a vaporizer *Cannabis* filling material or is a *Cannabis* cigarette.

According to an embodiment, the composition comprises (a) at least one cannabinoid from the group consisting of THC, CBD, CBG, CBC, CBN, CBL, THCV, CBDV and their non-decarboxylated form thereof; (b) a non-cannabinoid, non-terpene carrier, comprising less than 5% by weight cellulose; (c) a primary terpene, forming at least 40% by weight of the total terpene content, wherein the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to a related embodiment said THC and/or THCa is present in a total concentration of at least 1% by weight, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment, said CBD and/or CBDa is present in a total concentration of at least 1% by weight, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said CBG and/or CBGa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said CBC and/or CBCa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said CBN and/or CBNa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said CBL and/or CBLa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said THCV and/or THCVa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said CBDV and/or CBDVa is present in a total concentration of at least 0.1% by weight, at least 0.5%, at least 1%, at least 2%, at least 3%, at least 4%, at least 5%, at least 6%, at least 8%, at least 10%, at least 12%, at least 14%, at least 16%, at least 18% or at least 20%, at least 30%, at least 40%, at least 50%, at least 60%, at least 70%, at least 80%, or at least 90% by weight of the composition.

According to a related embodiment said non-cannabinoid non-terpene carrier comprises less than 5% by weight cellulose, less than 4%, less than 3%, less than 2%, or less than 1%, or less than 0.5% by weight cellulose.

According to a related embodiment, said primary terpene forms at least 20% by weight of the total terpene content, at least 30%, at least 40%, at least 50%, at least 60%, at least 70%, at least 80% or at least 90% by weight of the total terpene content. According to a related embodiment, said primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to an embodiment, said composition is liquid. According to an embodiment, said composition is provided in a form selected from the group consisting of vaporizer *Cannabis* filling liquid, *Cannabis* tablets, *Cannabis* suppositories, rectal candle, cigarette, vaporizer liquid nasal preparation, preparations containing micro and nano-emulsions, preparations containing micro and nano-particles, *Cannabis* gel capsules, *Cannabis* candies, *Cannabis* drinks and *Cannabis* baked products.

According to an embodiment, the primary terpene of the composition is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to an embodiment, administration of the composition results in an increased therapeutic effect compared with that obtained by administration of a composition comprising a same specific cannabinoids amounts and a smaller amount of the primary terpene, e.g. one fifth, one quarter, one third or one half of that amount. According to various embodiment, the increased therapeutic effect has various forms, e.g. a shorter onset time, increased magnitude, extended duration, reduced dosages, reduction of at least one secondary adverse symptom, reduced frequency of conditions and/or symptoms, reduced severity of conditions and/or symptoms, reduced consumption of other drugs and combinations thereof. According to an embodiment, the increased therapeutic effect comprises a shorter onset time, or differently put an earlier effect, which is important particularly in cases of sublingual and topical delivery and in cases where a rapid effect is desired, as in treating pain. According to an embodiment, the increased therapeutic effect comprises extended duration of the therapeutic effect, for example an extended time of pain relief. According to an embodiment, the increased therapeutic effect comprises increased magnitude of the therapeutic effect, enabling achieving a desired therapeutic effect on administering smaller doses of cannabinoids, saving thereby on cost. According to an embodiment, the increased therapeutic effect comprises using smaller doses of cannabinoids and still achieving at least the same beneficial result. According to an embodiment, the increased therapeutic effect comprises reduction of at least one secondary adverse symptom, e.g. adverse symptoms of the main condition, of adverse symptoms of another condition and/or symptoms related to administering the composition or other drugs. According to an embodiment, the increased therapeutic effect comprises reduced frequency of the conditions and/or symptoms. According to an embodiment, the increased therapeutic effect comprises reduced severity of the conditions and/or symptoms.

According to an embodiment, the primary terpene and the at least one cannabinoid are present in specific amounts, and the onset time of the therapeutic effect obtained by administering the composition, as measured by methods known in the art, is at least 20% shorter than that obtained by administering a composition comprising a same specific cannabinoids amounts and one fifth the amount of the primary terpene, at least 30%, at least 40%, at least 50%, at least 60%, or at least 70% shorter. According to an embodiment, the primary terpene, at least two secondary terpenes and the at least one cannabinoid are present in specific amounts, and the onset time of the therapeutic effect obtained by administering the composition is at least 20% shorter than that obtained by administering a composition comprising a same specific cannabinoids amounts, same secondary terpene amounts and one fifth the amount of the primary terpene, at least 30%, at least 40%, at least 50%, at least 60%, or at least 70% short. Shorter onset time, or differently put an earlier effect, is important particularly in cases of sublingual and topical delivery and in cases where a rapid effect is desired, as in treating pain.

According to an embodiment, the primary terpene and the cannabinoids are present in specific amounts, and the onset time of the therapeutic effect obtained by administering the composition is at least 20% longer than that of administering a composition comprising a same specific cannabinoids amounts and one fifth the amount of the at least primary terpene, at least 30%, at least 40%, at least 50%, at least 60%, or at least 70% longer. According to an embodiment, the primary terpene, at least three secondary terpene and the at least one cannabinoids are present in specific amounts, and the onset time of the therapeutic effect obtained by administering the composition is at least 20% longer than that obtained by administering a composition comprising a same specific cannabinoids amounts, same secondary terpene amounts and one fifth the amount of the primary terpene, at least 30%, at least 40%, at least 50%, at least 60%, or at least 70% longer. According to an embodiment, compositions of delayed onset time are used in combination with shorter onset time to reach a sustained release effect.

According to an embodiment, the primary terpene and the at least one cannabinoid are present in specific amounts, and the magnitude of the therapeutic effect obtained by administering the composition, as measured by methods known in the art, is at least 20% greater compared with that obtained by administering a composition comprising a same specific cannabinoids amounts and one fifth the amount of the primary terpene, at least 30%, at least 40%, at least 50%, at least 60%, or at least 70% greater. According to an embodiment, the primary terpene, at least three secondary terpenes and the at least one cannabinoid are present in specific amounts, and the magnitude of the therapeutic effect obtained by administering the composition is at least 20% greater than that obtained by administering a composition comprising a same specific cannabinoids amounts, same secondary terpene amounts and one fifth the amount of the primary terpene, at least 30%, at least 40%, at least 50%, at least 60%, or at least 70% greater. Without wishing to be limited by any particular theory, such increased magnitude of the therapeutic effect may indicate increased bioavailability. Such increased magnitude enables achieving a desired therapeutic effect on administering smaller doses of cannabinoids, saving thereby on cost.

According to an embodiment, the primary terpene and the at least one cannabinoid are present in specific amounts, and the duration of the therapeutic effect obtained by administering the composition, as measured by methods known in the art, is at least 20% longer compared with that obtained by administering a composition comprising a same specific cannabinoids amounts and one fifth the amount of the primary terpene, at least 30%, at least 40%, at least 50%, at least 60%, at least 70%, at least 80%, at least 90% or at least 100% longer. According to an embodiment, the primary terpene, at least three secondary terpenes and the at least one cannabinoid are present in specific amounts, and the duration of the therapeutic effect obtained by administering the composition is at least 20% longer than that obtained by administering a composition comprising a same specific cannabinoids amounts, same secondary terpene amounts and one fifth the amount of the primary terpene, at least 30%, at least 40%, at least 50%, at least 60%, at least 70%, at least 80%, at least 90% or at least 100% longer.

According to an embodiment, the primary terpene and the at least one cannabinoid are present in specific amounts, and the frequency of the conditions and/or symptoms obtained by administering the composition, as measured by methods known in the art, is at least 20% smaller compared with that obtained by administering a composition comprising a same specific cannabinoids amounts and one fifth the amount of the primary terpene, at least 30%, at least 40%, at least 50% at least 60%, at least 70%, at least 80%, or at least 90% smaller. According to an embodiment, the primary terpene, at least three secondary terpenes and the at least one cannabinoid are present in specific amounts, and the frequency of the conditions and/or symptoms obtained by administering the composition, as measured by methods known in the art, is at least 20% smaller than that obtained by administering a composition comprising a same specific cannabinoids amounts, same secondary terpene amounts and one fifth the amount of the primary terpene, at least 30%, at least 40%, at least 50%, at least 60%, at least 70%, at least 80%, at least 90% or at least 100% longer.

According to an embodiment, the primary terpene and the at least one cannabinoid are present in specific amounts, and the severity of the conditions and/or symptoms obtained by administering the composition, as measured by methods known in the art, is at least 20% smaller compared with that obtained by administering a composition comprising a same specific cannabinoids amounts and one fifth the amount of the primary terpene, at least 30%, at least 40%, at least 50% at least 60%, at least 70%, at least 80%, or at least 90% smaller. According to an embodiment, the primary terpene, at least three secondary terpenes and the at least one cannabinoid are present in specific amounts, and the severity of the conditions and/or symptoms obtained by administering the composition, as measured by methods known in the art, is at least 20% smaller than that obtained by administering a composition comprising a same specific cannabinoids amounts, same secondary terpene amounts and one fifth the amount of the primary terpene, at least 30%, at least 40%, at least 50%, at least 60%, at least 70%, at least 80%, at least 90% or at least 100% smaller.

According to an embodiment, the primary terpene and the at least one cannabinoid are present in specific amounts, and the consumption of other drugs when administering the composition is reduced by at least 20% compared with that when administering a composition comprising a same specific cannabinoids amounts and one fifth the amount of said primary terpene, reduced by at least 30%, by at least 40%, by at least 50%, by at least 60%, by at least 70%, by at least 80%, or by at least 90%. According to an embodiment, the primary terpene, at least three secondary terpenes and the at least one cannabinoid are present in specific amounts, and the consumption of other drugs when administering the composition, as measured by methods known in the art, is reduced by at least 20% compared with that obtained when administering a composition comprising a same specific cannabinoids amounts, same secondary terpene amounts and one fifth the amount of the primary terpene, reduced by at least 30%, by at least 40%, by at least 50%, by at least 60%, by at least 70%, by at least 80%, or by at least 90%.

According to an embodiment said conditions and/or symptoms associated therewith comprise prostate abnormality and said composition comprises at least one of CBD, THC, CBC, CBG, CBN, CBL, THCV and CBDV. According to an embodiment said conditions and/or symptoms associated therewith comprise prostate abnormality and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise prostate abnormality and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise prostate abnormality and said primary terpene is selected from the group consisting of thujone, pinene, limonene, cymene, caryophyllene, caryophyllene oxide, eucalyptol, terpineol, sabinene, linalool, cardinol, carene, geraniol, camphor, viridiflorol, germacrene, citronellol, myrtenol, santalol and combinations thereof. According to an embodiment, the composition comprises at least 2 of these primary terpenes, at least 3, at least 4, or at least 5 of the primary terpenes. According to an embodiment, the primary terpene is selected from the group consisting of limonene, eucalyptol, linalool and combinations thereof. According to an embodiment, the primary terpene is selected from the group consisting of limonene, pinene, linalool and combinations thereof. According to an embodiment, the primary terpene is selected from the group consisting of linalool, geraniol, pinene and combinations thereof. According to various embodiments said primary terpene comprises thujone, limonene, cymene, caryophyllene, caryophyllene oxide, eucalyptol, terpineol, sabinene, cardinol, carene, geraniol, camphor, viridiflorol, germacrene, citronellol, myrtenol and/or santalol. According to an embodiment, said conditions and/or symptoms associated therewith comprise prostate abnormality and the composition further comprises a compound selected from the group consisting of zincum metallicum, omega 3, genistein, daidzein, glycitein and combinations thereof.

According to an embodiment, said conditions and/or symptoms associated therewith comprise prostate abnormality and the composition further comprises an herbal extract selected from the group consisting of *Althea officinalis, andrographis paniculata, Anemarrhenae asphodeloides, Apium graveolens, Arctostaphylos uva-ursi, Barosma betulina, Coptis chinensis, Echinacea* spp, *Hydrastis canadensis, Plantago* spp, *Uncaria tomentosa, Zea mays, Serenoa serrulate, Urtica dioica, Pigeum africanum, Opuntia ficus indica, Ganoderma lucidum, Silybum marinum* and combinations thereof.

According to an embodiment said conditions and/or symptoms associated therewith comprise prostate cancer and said composition comprises at least one of CBD, THC, CBC, CBG, CBN, CBL, THCV and CBDV. According to an embodiment said conditions and/or symptoms associated therewith comprise prostate cancer and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise prostate cancer and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise prostate cancer and said primary terpene is selected from the group consisting of myrcene, pinene, limonene, caryophyllene, caryophyllene oxide, terpinene, citronellol, linalool, humulene, amyrin, cycloartenol and combinations thereof. According to an embodiment, the composition comprises at least 2 of these primary terpenes, at least 3, at least 4, or at least 5 of the primary terpenes. According to an embodiment, the primary terpene is selected from the group consisting of myrcene, limonene, caryophyllene and combinations thereof. According to an embodiment, the primary terpene is selected from the group consisting of limonene, caryophyllene, terpinene and combinations thereof. According to an embodiment, the primary terpene is selected from the group consisting of myrcene, limonene, caryophyllene, terpinene, citronellol and combinations thereof. According to various embodiments said primary terpene comprises myrcene, pinene, caryophyllene, caryophyllene oxide, terpinene, citronellol, linalool, humulene, amyrin and/or cycloartenol. According to an embodiment said conditions and/or symptoms associated therewith comprise prostate cancer and the composition further comprises a compound selected from the group consisting of lycopene, curcumin, epigallocatechin gallate, omega 3, capsaicin, selenium, vitamin D, allicin and combinations thereof. According to an embodiment said conditions and/or symptoms associated therewith comprise prostate cancer and the composition further comprises an herbal extract selected from the group consisting of extracts of *Serenoa serrulate, Camellia sinensis, Silybum marinum, Tabebuia impestiginosa*, red clover, *Punica granatum, Zingiber officinalis, Ginseng* and combinations thereof.

According to an embodiment said conditions and/or symptoms associated therewith comprise male infertility and said composition comprises at least one of CBD, THC, CBC, CBG, CBN, CBL, THCV and CBDV. According to an embodiment said conditions and/or symptoms associated therewith comprise male infertility and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise male infertility and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise male infertility and said primary terpene is selected from the group consisting of citronellol, geraniol, nerol, farnesol, eucalyptol, sabinene, caryophyllene, pinene, limonene, santalol, linalool, terpineol, terpinene and combinations thereof. According to an embodiment, the composition comprises at least 2 of these primary terpenes, at least 3, at least 4, or at least 5 of the primary terpenes. According to an embodiment, the primary terpene is selected from the group consisting of pinene, linalool, ecualyptol and combinations thereof. According to various embodiments said primary terpene comprises citronellol, geraniol, nerol, farnesol, sabinene, caryophyllene, limonene, santalol, terpineol and/or terpinene. According to an embodiment, said conditions and/or symptoms associated therewith comprise male infertility and the composition further comprises a compound selected from the group consisting of phenyl acetonitrile, zincum metallicum, omega 3 and combinations thereof. According to an embodiment said conditions and/or symptoms associated therewith comprise male infertility and the composition further comprises an herbal extract selected from the group consisting of extracts of extracts of *Lepidium meyenii, Panax Ginseng, Serenoa serrulata, Withania somnifera, Lycium barbarum, Ginseng, Epimedium grandiflorum, Turnera diffusa Vitex agnus castus, Withania somnifera, Ginseng, Eucommia ulmoides, Tribulus terrestris, Psoralea drupaceae, Alpinia galanga, Alpinia officinarum, Boesenbergia rotunda, Kaempferia galanga* and combination thereof.

According to an embodiment said conditions and/or symptoms associated therewith comprise reduced libido and/or sexual dysfunction and said composition comprises at least one of CBD, THC, CBC, CBG, CBN, CBL, THCV and CBDV. According to an embodiment said conditions and/or symptoms associated therewith comprise reduced libido and/or sexual dysfunction and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise reduced libido and/or sexual dysfunction and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise reduced libido and/or sexual dysfunction and said primary terpene is selected from the group consisting of limonene, linalool, terpineol, geraniol, eucalyptol, pinene, citronellol and combinations thereof. According to an embodiment, the composition comprises at least 2 of these primary terpenes, at least 3, at least 4, or at least 5 of the primary terpenes. According to an embodiment, the primary terpene is selected from the group consisting of limonene, linalool, ecualyptol and combinations thereof. According to various embodiments said primary terpene comprises terpineol, geraniol and/or pinene. According to an embodiment, said conditions and/or symptoms associated therewith comprise reduced libido and/or sexual dysfunction and the composition further comprises a compound selected from the group consisting of phenyl acetonitrile, zincum metallicum, omega 3 and combinations thereof. According to an embodiment, said conditions and/or symptoms associated therewith comprise reduced libido and/or sexual dysfunction and the composition further comprises an herbal extract selected from the group consisting of *Epimedium grandiflorum, Ganoderma lucidum, Lepidium meyenii, Turnera diffusa, Vitex agnus castus, Withania somnifera, Ginseng, Eucommia ulmoides, Tribulus terrestris, Psoralea drupaceae, Alpinia galanga, Alpinia officinarum, Boesenbergia rotunda, Kaempferia galanga* and combinations thereof.

According to an embodiment said conditions and/or symptoms associated therewith comprise hair loss and/or hair thinning and said composition comprises at least one of CBD, THC, CBC, CBG, CBN, CBL, THCV and CBDV. According to an embodiment said conditions and/or symptoms associated therewith comprise hair loss and/or hair thinning and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise hair loss and/or hair thinning and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise hair loss and/or hair thinning and said primary terpene is selected from the group consisting of linalool, terpineol, eucalyptol, borneol, camphor, pinene, geraniol and combinations thereof. According to an embodiment, the composition comprises at least 2 of these primary terpenes, at least 3, at least 4, or at least 5 of the primary terpenes. According to an embodiment, the primary terpene is selected from the group consisting of geraniol, eucalyptol, terpineol and combinations thereof. According to various embodiments said primary terpene comprises linalool, borneol, camphor and/or pinene. According to an embodiment, said conditions and/or symptoms associated therewith comprise hair loss and/or hair thinning and the composition further comprises an herbal extract selected from the group consisting of *Rehmania glutinosa preparata, Rosmarinus officinalis, Serenoa serrulata, Urtica dioica* and combinations thereof.

According to an embodiment said conditions and/or symptoms associated therewith comprise irregular body odor and said composition comprises at least one of CBD, THC, CBC, CBG, CBN, CBL, THCV and CBDV. According to an embodiment said conditions and/or symptoms associated therewith comprise irregular body odor and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise irregular body odor and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise irregular body odor and said primary terpene is selected from the group consisting of linalool, terpineol, geraniol, eucalyptol and combinations thereof. According to an embodiment, the composition comprises at least 2 of these primary terpenes, at least 3, or all 4 of the primary terpenes. According to an embodiment, the primary terpene is selected from the group consisting of linalool, terpineol, geraniol and combinations thereof.

According to an embodiment said conditions and/or symptoms associated therewith comprise partial androgen deficiency of the ageing male (PADAM) and/or andropause and said composition comprises at least one of CBD, THC, CBC, CBG, CBN, CBL, THCV and CBDV. According to an embodiment said conditions and/or symptoms associated therewith comprise partial androgen deficiency of the ageing male (PADAM) and/or andropause and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise partial androgen deficiency of the ageing male (PADAM) and/or andropause and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise partial androgen deficiency of the ageing male (PADAM) and/or andropause and said primary terpene is selected from the group consisting of caryophyllene, caryophyllene oxide, carene, linalool, myrcene, terpinene, terpineol, citronellol, eucalyptol, nerolidol, limonene, geraniol, menthol, iso-menthone, germacrene, pinene, cardinol, neral, geranial, menth-2-en-1-ol, bisabolol, phytol, pulegone, cymene, fenchol, humulene, guaiol, borneol, carene, sabinene, myrtenol, camphene, nerol, farnesol, carotol and combinations thereof. According to an embodiment, the composition comprises at least 2 of these primary terpenes, at least 3, at least 4, or at least 5 of the primary terpenes. According to an embodiment, the primary terpene is selected from the group consisting of caryophyllene, linalool, carene and combinations thereof. According to an embodiment, the primary terpene is selected from the group consisting of caryophyllene, linalool, myrcene and combinations thereof. According to an embodiment, the primary terpene is selected from the group consisting of nerolidol, limonene, linalool and combinations thereof. According to an embodiment, the primary terpene is selected from the group consisting of caryophyllene, linalool, carene, nerolidol, limonene and combinations thereof. According to various embodiments said primary terpene comprises caryophyllene, caryophyllene oxide, carene, myrcene, terpinene, terpineol, citronellol, eucalyptol, nerolidol, limonene, geraniol, menthol, iso-menthone, germacrene, pinene, cardinol, neral, geranial, menth-2-en-1-ol, pulegone, cymene, fenchol, humulene, guaiol, borneol, carene, sabinene, myrtenol, camphene, nerol, farnesol and/or carotol. According to an embodiment, said conditions and/or symptoms associated therewith comprise partial androgen deficiency of the ageing male (PADAM) and/or andropause and the composition further comprises a compound selected from the group consisting of drupanol, genistein, daidzein, glycitein and combinations thereof.

According to an embodiment, said conditions and/or symptoms associated therewith comprise partial androgen deficiency of the ageing male (PADAM) and/or andropause and the product further comprises an herbal extract selected from the group consisting of *Angelica sinensis, Anemarrhenae asphodeloides, Cimicifuga (actaea) Racemosa, Glycyrrhiza glabra. Hypericum perforatum, Panax quinquefolium, Trifolium pratense, Avena sativa, Cimicifuga (actaea) Racemosa, Humulus lupulus, Hypericum perforatum, Lavendula officinalis, Melissa officinalis, Passiflora incarnata, Valeriana officinalis, Eucommia ulmoides, Tribulus terrestris, Ginseng, Psoralea drupaceae, Alpinia galanga, Alpinia officinarum, Boesenbergia rotunda, Kaempferia galanga* and combinations thereof.

According to an embodiment said conditions and/or symptoms associated therewith comprise male urogenital and/or reproductive system infections and/or disorders and said composition comprises at least one of CBD, THC, CBC, CBG, CBN, CBL, THCV and CBDV. According to an embodiment said conditions and/or symptoms associated therewith comprise male urogenital and/or reproductive system infections and/or disorders and said composition comprises CBD and optionally THC at CBD to THC weight/weight ratio greater than 1:1, greater than 2:1, greater than 3:1, greater than 4:1 or greater than 5:1. According to an embodiment said conditions and/or symptoms associated therewith comprise male urogenital and/or reproductive system infections and/or disorders and said composition comprises THC and optionally CBD at THC to CBD weight/weight ratio greater than 0.9:1, greater than 2:1, greater than 3:1, greater than 4:1 or greater than 5:1. According to various embodiments, said composition comprises CBD, comprises THC, comprises CBC, comprises CBG, comprises CBN, comprises CBL, comprises THCV and/or comprises CBDV. According to an embodiment said conditions and/or symptoms associated therewith comprise male urogenital and/or reproductive system infections and/or disorders and said primary terpene is selected from the group consisting of myrcene, humulene, caryophyllene, linalool, terpineol, geraniol, pinene, germacrene, citronellol, limonene, myrcene, terpinene, menth-2-en-1-ol, borneol, eucalyptol, myrtenol, cymene, caryophyllene oxide, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene, thujone and combinations thereof. According to an embodiment, the composition comprises at least 2 of these primary terpenes, at least 3, at least 4, or at least 5 of the primary terpenes. According to an embodiment, the primary terpene is selected from the group consisting of linalool, pinene, caryophyllene oxide and combinations thereof. According to an embodiment, the primary terpene is selected from the group consisting of geraniol, linalool, pinene, caryophyllene oxide and combinations thereof. According to various embodiments said primary terpene comprises myrcene, humulene, caryophyllene, terpineol, geraniol, germacrene, citronellol, limonene, myrcene, terpinene, menth-2-en-1-ol, borneol, eucalyptol, myrtenol, cymene, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene and/or thujone. According to an embodiment, said conditions and/or symptoms associated therewith comprise male urogenital and/or reproductive system infections and/or disorders and the composition further comprises an herbal extract selected from the group consisting of *Apium graveolens, Dioscorea villosa* spp, *Althea officinalis, Anemarrhenae asphodeloides, Anemarrhenae asphodeloides, Apium graveolens, Arctostaphylos uva-ursi, Barosma betulina, Coptis*

*chinensis, Echinacea* spp, *Equisitum arvense, Hydrastis canadensis, Plantago* spp, *Serenoa serrulata, Uncaria tomentosa, Urtica dioica, Viola tricolor, Zea mays* and combinations thereof.

According to an embodiment, terpene-enriched cannabinoid composition is produced by adding isolated terpenes to a *Cannabis* extract composition.

According to an embodiment, the method for treating a patient comprises (i) administering to the patient for a first period of time a first terpene-enriched *Cannabis* composition comprising a first cannabinoid at a first cannabinoid amount and a first primary terpene at a first primary terpene amount, followed by (ii) administering to the patient for a second period of time a second terpene-enriched *Cannabis* composition comprising the first cannabinoid amount and a second primary terpenes at a second primary terpene amount. According to an embodiment, the method further comprises administering to the patient for a third period of time the first terpene-enriched *Cannabis* composition comprising the first cannabinoid amount and a third primary terpene at a third primary terpene amount. According to an embodiment, the third primary terpene is identical to the first primary terpene.

According to an embodiment, the method for treating a patient comprises administering to said subject for a first period of time a first said composition comprising a first cannabinoid at a first cannabinoid amount and a first primary terpene at a first primary terpene amount, followed by (i) administering to said subject for a second period of time said composition comprising said first cannabinoid at said first cannabinoid amount or less and a second primary terpene at a second primary terpene amount; (ii) administering to said subject for a second period of time said composition comprising said first cannabinoid at said first cannabinoid amount or less and a first primary terpene at an increased first primary terpene amount; (iii) administering to said subject for a second period of time said composition comprising said first cannabinoid at a said first cannabinoid amount or less, first primary terpene at a first primary terpene amount and at least one secondary terpene; and/or (iv) administering to said subject for a second period of time said composition comprising said first cannabinoid at a said first cannabinoid amount or less, first primary terpene at a first primary terpene amount and a second primary terpene.

According to another embodiment, the method for treating a patient comprises (i) administering to the patient a first terpene-enriched *Cannabis* composition comprising a first cannabinoid at a first cannabinoid amount and a first primary terpene at a first primary terpene amount and administering to the patient, at least 2 hours later a second terpene-enriched *Cannabis* composition comprising the first cannabinoid amount and a second primary terpenes at a second primary terpene amount. According to another embodiment, the first terpene-enriched *Cannabis* composition is administered for day time and the second terpene-enriched *Cannabis* composition is administered for night time.

According to another embodiment, the method for treating a patient comprises administering to the patient (i) a first terpene-enriched *Cannabis* composition comprising a first cannabinoid at a first cannabinoid amount and a first primary terpene at a first primary terpene amount and (ii) a second terpene-enriched *Cannabis* composition comprising the first cannabinoid and a second primary terpenes at a second primary terpene amount.

According to an embodiment, the method for treating a patient comprises (i) administering to the patient multiple *Cannabis* compositions to find the best working one; (ii) mimicking the best working composition by extracting *Cannabis* plant material to form an extract and blending the extract with suitable terpenes, whereby a mimicking composition is formed and (iii) administering to the patient the mimicking composition. According to an embodiment, the method further comprises removing terpenes from the extract prior to the blending.

According to an embodiment, the method for treating a patient comprises administering to said patient a product selected from the group consisting of tablets, gel capsules, medical patches, topicals, creams, varnishes, sublingual oils, sprays, edibles, suppositories including rectal candles, cigarettes, vaporizer liquids, micro and nano-emulsions, preparations containing micro and nano-particle and combinations thereof, comprising the composition. According to an embodiment, the product comprises tablets comprising the composition. According to an embodiment, the product comprises gel capsules comprising the composition. According to an embodiment, the product comprises medical patches comprising the composition. According to an embodiment, the composition comprises the composition in a form suitable for topical administration. According to an embodiment, the product comprises creams comprising the composition. According to an embodiment, the product comprising varnishes comprising the composition. According to an embodiment, the product comprising oils comprising the composition in a form suitable for sublingual administration. According to an embodiment, there is provided an edible product comprising the composition. According to an embodiment, the product comprising rectal candles comprising the composition. According to an embodiment, the product comprises a cigarette comprising the composition. According to an embodiment, the product comprises vaporizer liquids containing the composition.

According to an embodiment, further provided is a method for treating conditions and/or symptoms associated therewith selected from the group consisting of androgen deficiency, male infertility, male urogenital or reproductive system infections and/or disorders, the method comprising administering to a subject in need a therapeutically effective amount of a composition comprising (i) a primary terpene in a specific amount; (ii) optionally at least three secondary terpenes; and (iii) optionally at least one cannabinoid in a specific amount. According to an embodiment, the composition comprises less than 20% by weight water. According to an embodiment, the conditions and/or symptoms are selected from the group consisting of prostate abnormality, prostate cancer, impaired and/or reduced fertility, hot flashes, sweating, fatigue, irritability, decreased physical and/or mental energy, memory loss, depression, anger anxiety, nervousness, restless, stress, mood swing, affect disorder, muscle tension, myalgia, decreased muscle mass, intermittent dizziness, weight gain, urinary incontinence, lower urinary tract disorders, male urogenital and/or reproductive system infection, reduced libido and/or sexual desire, sexual dysfunction, hair loss and/or thinning, irregular body odor, conditions and/or symptoms induced by androgen deficiency, conditions and/or symptoms associated with partial androgen deficiency of the ageing male (PADAM) and/or andropause dysfunction and combinations thereof.

According to an embodiment, the composition additionally contains an additive selected from the group consisting of antioxidants, emulsifiers and texturizers vegetable oils, plant extracts, honey, sucrose, glucose and fructose, pharmaceutical excipients and combinations thereof.

According to an embodiment, the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to an embodiment, the composition comprises a primary terpene and optionally at least three secondary terpenes, at least four or at least five.

The term "terpene", as used herein, refers to both terpenes and terpenoids.

As used here, the term "primary terpene" refers to a single terpene or a mixture of terpenes, which single terpene or mixture of terpenes forms at least 20% by weight of the total amount of terpenes in the product, at least 30%, at least 40%, at least 50%, at least 60%, at least 70% or at least 80%. As used here, the term "secondary terpene" refers to a single terpene that forms at least 0.00001% of the product and less than 10% by weight of the total amount of terpenes in the composition, less than 15%, less than 10%, less than 5%, less than 2% or even less than 1%. According to an embodiment, the content of the primary terpene in the product is at least 2 times greater than that of any secondary terpene, at least 4, at least 6, at least 8, at least 10, at least 15, at least 20, at least 25, or at least 30 times greater.

According to an embodiment, the primary terpene comprises a single terpene and said single terpene forms at least 20% by weight of the total amount of terpenes in the product, at least 30%, at least 40%, at least 50%, at least 60%, at least 70% or at least 80%.

According to another embodiment, the primary terpene comprises a mixture of terpenes, e.g. two terpenes, three terpenes, four terpenes, five terpenes or more. According to another embodiment, each one of the terpenes forms between e.g. 1% and e.g. 40% by weight of the total amount of terpenes in the product and together form at least 20% by weight of the total amount of terpenes in the product, at least 30%, at least 40%, at least 50%, at least 60%, at least 70% or at least 80%.

According to another embodiment, the primary terpene comprises a mixture of terpenes, e.g. three terpenes, four terpenes, five terpenes or more, out of which two or three form between e.g. 10% and e.g. 40% by weight of the total amount of terpenes in the product, while the rest of the terpenes in the mixture form between e.g. 1% and e.g. 10% by weight of the total amount of terpenes in the product. Combined, the mixture of terpenes in the primary terpene forms at least 20% by weight of the total amount of terpenes in the product, at least 30%, at least 40%, at least 50%, at least 60%, at least 70% or at least 80%.

According to another embodiment, the product comprises at least three secondary terpenes, at least four, at least five or at least six, each one of which forms at least 0.00001% of the product and less than 10% by weight of the total amount of terpenes in the composition, less than 15%, less than 10%, less than 5%, less than 2% or even less than 1%.

According to an embodiment, the composition comprises at least 5% by weight carrier, at least 10%, at least 15%, at least 20%, at least 25%, at least 30%, at least 35% or at least 40% by weight. Any compound other than cannabinoids and terpenes is a suitable carrier. According to an embodiment, the carrier is selected from the group consisting of vegetable oils, e.g. coconut oil, olive oil or sesame oil, pharmaceutical excipients, honey, bees wax, cellulose and combinations thereof. According to an embodiment, the carrier is an essential oil. According to an embodiment, the carrier is an herbal extract.

According to an embodiment, the primary terpene is present in specific amounts, and the onset time of the therapeutic effect obtained by administering the composition, as measured by methods known in the art, is at least 20% shorter than that obtained by administering a composition comprising one half said specific amount of the primary terpene, at least 30%, at least 40%, at least 50%, at least 60%, or at least 70% shorter. According to an embodiment, the primary terpene and at least three secondary terpenes are present in specific amounts, and the onset time of the therapeutic effect obtained by administering the composition is at least 20% shorter than that obtained by administering a composition comprising the same secondary terpene amounts and one half said specific amount of the primary terpene, at least 30%, at least 40%, at least 50%, at least 60%, or at least 70% short. Shorter onset time, or differently put an earlier effect, is important particularly in cases of sublingual and topical delivery and in cases where a rapid effect is desired, as in treating pain.

According to an embodiment, the primary terpene is present in specific amounts, and the onset time of the therapeutic effect obtained by administering the composition is at least 20% longer than that obtained by administering a composition comprising one half said specific amount of the primary terpene, at least 30%, at least 40%, at least 50%, at least 60%, or at least 70% longer. According to an embodiment, the primary terpene and at least three secondary terpenes are present in specific amounts, and the onset time of the therapeutic effect obtained by administering the composition is at least 20% longer than that obtained by administering a composition comprising the same secondary terpene amounts and one half said specific amount of the primary terpene, at least 30%, at least 40%, at least 50%, at least 60%, or at least 70% longer. According to an embodiment, compositions of delayed onset time are used in combination with shorter onset time to reach a sustained release effect.

According to an embodiment, the primary terpene is present in specific amounts, and the magnitude of the therapeutic effect obtained by administering the composition, as measured by methods known in the art, is at least 20% greater compared with that obtained by administering a composition comprising one half said specific amount of the primary terpene, at least 30%, at least 40%, at least 50%, at least 60%, or at least 70% greater. According to an embodiment, the primary terpene, and the at least three secondary terpenes are present in specific amounts, and the magnitude of the therapeutic effect obtained by administering the composition is at least 20% greater than that obtained by administering a composition comprising the same secondary terpene amounts and one half said specific amount of the primary terpene, at least 30%, at least 40%, at least 50%, at least 60%, or at least 70% greater. Without wishing to be limited by any particular theory, such increased magnitude of the therapeutic effect may indicate increased bioavailability. Such increased magnitude enables achieving a desired therapeutic effect on administering smaller doses of cannabinoids, saving thereby on cost.

According to an embodiment, the primary terpene is present in specific amounts, and the duration of the therapeutic effect obtained by administering the composition, as measured by methods known in the art, is at least 20% longer compared with that obtained by administering a composition comprising one half said specific amount of the primary terpene, at least 30%, at least 40%, at least 50%, at least 60%, at least 70%, at least 80%, at least 90% or at least 100% longer. According to an embodiment, the primary terpene and at least three secondary terpenes are present in specific amounts, and the duration of the therapeutic effect obtained by administering the composition is at least 20% longer than that obtained by administering a composition comprising the same secondary terpene amounts and one half said specific amount of the primary terpene, at least 30%, at least 40%, at least 50%, at least 60%, at least 70%, at least 80%, at least 90% or at least 100% longer.

According to an embodiment, the primary terpene is present in specific amounts, and the frequency of the conditions and/or symptoms obtained by administering the composition, as measured by methods known in the art, is at least 20% smaller compared with that obtained by administering a composition comprising one half said specific amount of the primary terpene, at least 30%, at least 40%, at least 50% at least 60%, at least 70%, at least 80%, or at least 90% smaller. According to an embodiment, the primary terpene and at least three secondary terpenes are present in specific amounts, and the frequency of the conditions and/or symptoms obtained by administering the composition, as measured by methods known in the art, is at least 20% smaller than that obtained by administering a composition comprising the same secondary terpene amounts and one half said specific amount of the primary terpene, at least 30%, at least 40%, at least 50%, at least 60%, at least 70%, at least 80%, at least 90% or at least 100% longer.

According to an embodiment, the primary terpene is present in specific amounts, and the severity of the conditions and/or symptoms obtained by administering the composition, as measured by methods known in the art, is at least 20% smaller compared with that obtained by administering a composition comprising one half said specific amount of the primary terpene, at least 30%, at least 40%, at least 50% at least 60%, at least 70%, at least 80%, or at least 90% smaller. According to an embodiment, the primary terpene and at least three secondary terpenes are present in specific amounts, and the severity of the conditions and/or symptoms obtained by administering the composition, as measured by methods known in the art, is at least 20% smaller than that obtained by administering the composition a composition comprising the same secondary terpene amounts and one half said specific amount of the primary terpene, at least 30%, at least 40%, at least 50%, at least 60%, at least 70%, at least 80%, at least 90% or at least 100% smaller.

According to an embodiment, the primary terpene is present in specific amounts, and the consumption of other drugs when administering the composition, is reduced by at least 20% compared with that when administering a composition comprising one half said specific amount of said primary terpene, reduced by at least 30%, by at least 40%, by at least 50%, by at least 60%, by at least 70%, by at least 80%, or by at least 90%. According to an embodiment, the primary terpene and at least three secondary terpenes are present in specific amounts, and the consumption of other drugs when administering the composition, as measured by methods known in the art, is reduced by at least 20% compared with administering a composition comprising the same secondary terpene amounts and one half said specific amount of the primary terpene, reduced by at least 30%, by at least 40%, by at least 50%, by at least 60%, by at least 70%, by at least 80%, or by at least 90%.

According to an embodiment said conditions and/or symptoms associated therewith comprise prostate abnormality and said primary terpene is selected from the group consisting of thujone, pinene, limonene, cymene, caryophyllene, caryophyllene oxide, eucalyptol, terpineol, sabinene, linalool, cardinol, carene, geraniol, camphor, viridiflorol, germacrene, citronellol, myrtenol, santalol and combinations thereof. According to an embodiment, the composition comprises at least 2 of these primary terpenes, at least 3, at least 4, or at least 5 of the primary terpenes. According to an embodiment, the primary terpene is selected from the group consisting of limonene, eucalyptol, linalool and combinations thereof. According to an embodiment, the primary terpene is selected from the group consisting of limonene, pinene, linalool and combinations thereof. According to an embodiment, the primary terpene is selected from the group consisting of linalool, geraniol, pinene and combinations thereof. According to various embodiments said primary terpene comprises thujone, limonene, cymene, caryophyllene, caryophyllene oxide, eucalyptol, terpineol, sabinene, cardinol, carene, geraniol, camphor, viridiflorol, germacrene, citronellol, myrtenol and/or santalol. According to an embodiment, said conditions and/or symptoms associated therewith comprise prostate abnormality and the composition further comprises a compound selected from the group consisting of zincum metallicum, omega 3, genistein, daidzein, glycitein and combinations thereof.

According to an embodiment said conditions and/or symptoms associated therewith comprise prostate cancer and said primary terpene is selected from the group consisting of myrcene, pinene, limonene, caryophyllene, caryophyllene oxide, terpinene, citronellol, linalool, humulene, amyrin, cycloartenol and combinations thereof. According to an embodiment, the composition comprises at least 2 of these primary terpenes, at least 3, at least 4, or at least 5 of the primary terpenes. According to an embodiment, the primary terpene is selected from the group consisting of myrcene, limonene, caryophyllene and combinations thereof. According to an embodiment, the primary terpene is selected from the group consisting of limonene, caryophyllene, terpinene and combinations thereof. According to an embodiment, the primary terpene is selected from the group consisting of myrcene, limonene, caryophyllene, terpinene, citronellol and combinations thereof. According to various embodiments said primary terpene comprises myrcene, pinene, caryophyllene, caryophyllene oxide, terpinene, citronellol, linalool, humulene, amyrin and/or cycloartenol. According to an embodiment said conditions and/or symptoms associated therewith comprise prostate cancer and the composition further comprises a compound selected from the group consisting of lycopene, curcumin, epigallocatechin gallate, omega 3, capsaicin, selenium, vitamin D, allicin and combinations thereof.

According to an embodiment said conditions and/or symptoms associated therewith comprise male infertility and said primary terpene is selected from the group consisting of citronellol, geraniol, nerol, farnesol, eucalyptol, sabinene, caryophyllene, pinene, limonene, santalol, linalool, terpineol, terpinene and combinations thereof. According to an embodiment, the composition comprises at least 2 of these primary terpenes, at least 3, at least 4, or at least 5 of the primary terpenes. According to an embodiment, the primary terpene is selected from the group consisting of pinene, linalool, ecualyptol and combinations thereof. According to various embodiments said primary terpene comprises citronellol, geraniol, nerol, farnesol, sabinene, caryophyllene, limonene, santalol, terpineol and/or terpinene. According to an embodiment, conditions and/or symptoms associated therewith comprise male infertility and the composition further comprises a compound selected from the group consisting of phenyl acetonitrile, zincum metallicum, omega 3 and combinations thereof.

According to an embodiment said conditions and/or symptoms associated therewith comprise reduced libido and/or sexual dysfunction and said primary terpene is selected from the group consisting of limonene, linalool, terpineol, geraniol, eucalyptol, pinene, citronellol and combinations thereof. According to an embodiment, the composition comprises at least 2 of these primary terpenes, at least 3, at least 4, or at least 5 of the primary terpenes. According to an embodiment, the primary terpene is selected from the group consisting of limonene, linalool, ecualyptol and combinations thereof. According to various embodiments said primary terpene comprises terpineol, geraniol and/or pinene, cintronellol. According to an embodiment, said conditions and/or symptoms associated therewith comprise decreased libido and/or sexual dysfunction and the composition further comprises a compound selected from the group consisting of phenyl acetonitrile, zincum metallicum, omega 3 and combinations thereof.

According to an embodiment said conditions and/or symptoms associated therewith comprise hair loss and/or hair thinning and said primary terpene is selected from the group consisting of linalool, terpineol, eucalyptol, borneol, camphor, pinene, geraniol and combinations thereof. According to an embodiment, the composition comprises at least 2 of these primary terpenes, at least 3, at least 4, or at least 5 of the primary terpenes. According to an embodiment, the primary terpene is selected from the group consisting of geraniol, eucalyptol, terpineol and combinations thereof. According to various embodiments said primary terpene comprises linalool, borneol, camphor and/or pinene.

According to an embodiment said t conditions and/or symptoms associated therewith comprise irregular body odor and said primary terpene is selected from the group consisting of linalool, terpineol, geraniol, eucalyptol and combinations thereof. According to an embodiment, the composition comprises at least 2 of these primary terpenes, at least 3, or all 4 of the primary terpenes. According to an embodiment, the primary terpene is selected from the group consisting of linalool, terpineol, geraniol and combinations thereof.

According to an embodiment said conditions and/or symptoms associated therewith comprise partial androgen deficiency of the ageing male (PADAM) and/or andropause and said primary terpene is selected from the group consisting of caryophyllene, caryophyllene oxide, carene, linalool, myrcene, terpinene, terpineol, citronellol, eucalyptol, nerolidol, limonene, geraniol, menthol, iso-menthone, germacrene, pinene, cardinol, neral, geranial, menth-2-en-1-ol, bisabolol, phytol, pulegone, cymene, fenchol, humulene, guaiol, borneol, carene, sabinene, myrtenol, camphene, nerol, farnesol, carotoland combinations thereof. According to an embodiment, the composition comprises at least 2 of these primary terpenes, at least 3, at least 4, or at least 5 of the primary terpenes. According to an embodiment, the primary terpene is selected from the group consisting of caryophyllene, linalool, carene and combinations thereof. According to an embodiment, the primary terpene is selected from the group consisting of caryophyllene, linalool, myrcene and combinations thereof. According to an embodiment, the primary terpene is selected from the group consisting of nerolidol, limonene, linalool and combinations thereof. According to an embodiment, the primary terpene is selected from the group consisting of caryophyllene, linalool, carene, nerolidol, limonene and combinations thereof. According to various embodiments said primary terpene comprises caryophyllene, caryophyllene oxide, carene, myrcene, terpinene, terpineol, citronellol, eucalyptol, nerolidol, limonene, geraniol, menthol, iso-menthone, germacrene, pinene, cardinol, neral, geranial, menth-2-en-1-ol, pulegone, cymene, fenchol, humulene, guaiol, borneol, carene, sabinene, myrtenol, camphene, nerol, farnesol and/or carotol. According to an embodiment, said conditions and/or symptoms associated therewith comprise partial androgen deficiency of the ageing male (PADAM) and/or andropause and the composition further comprises a compound selected from the group consisting of drupanol, genistein, daidzein, glycitein and combinations thereof.

According to an embodiment said conditions and/or symptoms associated therewith comprise male urogenital and/or reproductive system infections and/or disorders and said primary terpene is selected from the group consisting of myrcene, humulene, caryophyllene, linalool, terpineol, geraniol, pinene, germacrene, citronellol, limonene, myrcene, terpinene, menth-2-en-1-ol, borneol, eucalyptol, myrtenol, cymene, caryophyllene oxide, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene, thujone and combinations thereof. According to an embodiment, the composition comprises at least 2 of these primary terpenes, at least 3, at least 4, or at least 5 of the primary terpenes. According to an embodiment, the primary terpene is selected from the group consisting of linalool, pinene, caryophyllene oxide and combinations thereof. According to an embodiment, the primary terpene is selected from the group consisting of geraniol, linalool, pinene, caryophyllene oxide and combinations thereof. According to various embodiments said primary terpene comprises myrcene, humulene, caryophyllene, terpineol, geraniol, germacrene, citronellol, limonene, myrcene, terpinene, menth-2-en-1-ol, borneol, eucalyptol, myrtenol, cymene, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene and/or thujone.

According to an embodiment, the method for treating a patient comprises administering to said patient a product selected from the group consisting of tablets, gel capsules, medical patches, topicals, creams, varnishes, sublingual oils, sprays, edibles, suppositories including rectal candles, cigarettes, vaporizer liquids, micro and nano-emulsion preparations containing micro and nano-particle, and combinations thereof, comprising the administered composition. According to an embodiment, the product comprises tablets comprising the composition. According to an embodiment, the product comprises gel capsules comprising the composition. According to an embodiment, the product comprises medical patches comprising the composition. According to an embodiment, the product comprises the composition in a form suitable for topical administration. According to an embodiment, the product comprises creams comprising the composition. According to an embodiment, the product comprising varnishes comprising the composition. According to an embodiment, the product comprises oils comprising the composition in a form suitable for topical administration. According to an embodiment, the product comprises an edible composition. According to an embodiment, the product comprises rectal candles comprising the composition. According to an embodiment, the product comprises cigarettes comprising the composition. According to an embodiment, the product comprises vaporizer liquids containing the composition.

According to an embodiment, there is provided a composition comprising five or less terpenes in a concentration of at least 10% of the total terpene content, forming a terpene composition with enhanced therapeutic effect for treating conditions and/or symptoms associated with androgen deficiency, male fertility and/or male urogenital or reproductive system infections and/or disorders. A composition comprising five or less terpenes in a concentration of at least 10%, at least 12%, at least 15%, at least 20%, at least 25%, at least 30%, at least 35%, at least 40%, at least 45%, at least 50%, at least 55%, at least 60%, or at least 70% of the total terpene content. According to an embodiment, the conditions and/or symptoms are selected from the group consisting of prostate abnormality, prostate cancer, impaired and/or reduced fertility, hot flashes, sweating, fatigue, irritability, decreased physical and/or mental energy, memory loss, depression, anger anxiety, nervousness, restless, stress, mood swing, affect disorder, muscle tension, myalgia, decreased muscle mass, intermittent dizziness, weight gain, urinary incontinence, lower urinary tract disorders, male urogenital and/or reproductive system infection, reduced libido and/or sexual desire, sexual dysfunction, hair loss and/or thinning, irregular body odor, conditions and/or symptoms induced by androgen deficiency, conditions and/or symptoms associated with partial androgen deficiency of the ageing male (PADAM) and/or andropause dysfunction and combinations thereof.

According to an embodiment, the primary terpene is selected from the group consisting of pinene, limonene, linalool, caryophyllene, caryophyllene oxide, myrcene, humulene, borneol, eucalyptol, terpineol, nerolidol, phytol, geraniol, bisabolol, camphene, amyrin, thujone, citronellol, pulegone, cycloartenol, cymene, sabinene, carene, terpinene, fenchol, isopulegol, guaiol, phellandrene, eudesmol, ocimene, cardinol, elemene, friedelin, carvacrol, eugenol, camphor, menthol, iso-menthone, neral, gerial, viridiflorol, germacrene, thymol, Menth-2-en-1-ol, farensol, carotol, myrtenol and combinations thereof.

According to an embodiment, the composition additionally contains an additive selected from the group consisting of antioxidants, emulsifiers and texturizers vegetable oils, plant extracts, honey, sucrose, glucose and fructose, pharmaceutical excipients and combinations thereof.

According to an embodiment, the composition comprises less than 1% THC, less than 0.8%, less than 0.6%, less than 0.4%, less than 0.2%, or less than 0.1% THC.

According to an embodiment said conditions and/or symptoms associated therewith comprise prostate abnormality and said composition comprises thujone, pinene, limonene, eucalyptol and/or linalool. According to an embodiment, the composition comprises at least 2 of these terpenes, at least 3, at least 4, or all 5 of the terpenes. According to an embodiment, the composition comprises limonene, eucalyptol, linalool, pinene and/or geraniol and combinations thereof. According to various embodiments said primary terpene comprises thujone, limonene, cymene, caryophyllene, caryophyllene oxide, eucalyptol, terpineol, sabinene, cardinol, carene, geraniol, camphor, viridiflorol, germacrene, citronellol, myrtenol and/or santalol.

According to an embodiment said conditions and/or symptoms associated therewith comprise prostate cancer and said composition comprises myrcene, pinene, limonene, caryophyllene and/or terpinene. According to an embodiment, the composition comprises at least 2 of these terpenes, at least 3, at least 4, or all 5 of the terpenes. According to an embodiment, the composition comprises limonene, caryophyllene, pinene, terpinene and/or citronellol. According to an embodiment, the composition comprises limonene, caryophyllene, pinene, terpinene and/or citronellol. According to various embodiments said primary terpene comprises myrcene, pinene, caryophyllene, caryophyllene oxide, terpinene, citronellol, linalool, humulene, amyrin and/or cycloartenol.

According to an embodiment said conditions and/or symptoms associated therewith comprise male infertility and said composition comprises geraniol, eucalyptol, pinene, limonene, and/or linalool. According to an embodiment, the composition comprises at least 2 of these terpenes, at least 3, at least 4, or all 5 of the terpenes. According to an embodiment, the composition comprises pinene, linalool, ecualyptol, geraniol and combinations thereof. According to an embodiment, the composition comprises pinene, linalool, ecualyptol and combinations thereof. According to various embodiments said composition comprises citronellol, geraniol, nerol, farnesol, sabinene, caryophyllene, limonene, santalol, terpineol and/or terpinene.

According to an embodiment said conditions and/or symptoms associated therewith comprise reduced libido and/or sexual dysfunction and said composition comprises limonene, linalool, citronellol, geraniol and/or eucalyptol. According to an embodiment, the composition comprises at least 2 of these terpenes, at least 3, at least 4, or all 5 of the terpenes. According to an embodiment, the composition comprises limonene, linalool, ecualyptol, geraniol and combinations thereof. According to an embodiment, the composition comprises limonene, linalool, ecualyptol and combinations thereof. According to an embodiment, the composition comprises citronellol, linalool, ecualyptol and combinations thereof. According to various embodiments said composition comprises terpineol, geraniol, citronellol, farnesol and/or pinene.

According to an embodiment said conditions and/or symptoms associated therewith comprise hair loss and/or hair thinning and said composition comprises linalool, eucalyptol, geraniol, terpineol and/or pinene. According to an embodiment, the composition comprises at least 2 of these terpenes, at least 3, at least 4, or all 5 of the terpenes. According to an embodiment, the composition comprises geraniol, eucalyptol, terpineol, pinene and combinations thereof. According to an embodiment, the composition comprises geraniol, eucalyptol, terpineol and combinations thereof. According to various embodiments said composition comprises linalool, borneol, camphor and/or pinene.

According to an embodiment said conditions and/or symptoms associated therewith comprise irregular body odor and said composition comprises linalool, terpineol, geraniol, and/or eucalyptol. According to an embodiment, the composition comprises at least 2 of these terpenes, at least 3, or all 4 of the terpenes. According to an embodiment, the composition comprises linalool, terpineol, geraniol and combinations thereof. According to an embodiment, the composition comprises linalool, terpineol, geraniol and combinations thereof.

According to an embodiment said conditions and/or symptoms associated therewith comprise partial androgen deficiency of the ageing male (PADAM) and/or andropause and said composition comprises linalool, myrcene, limonene, eucalyptol and/or pinene. According to an embodiment, the composition comprises at least 2 of these terpenes, at least 3, at least 4, or all 5 of the terpenes. According to an embodiment, the composition comprises caryophyllene, linalool, carene, limonene and combinations thereof. According to an embodiment, the composition comprises caryophyllene, linalool, carene and combinations thereof.

According to an embodiment, the composition comprises caryophyllene, linalool, myrcene and combinations thereof. According to an embodiment, the composition comprises nerolidol, limonene, linalool and combinations thereof. According to an embodiment, the composition comprises caryophyllene, linalool, carene, nerolidol, limonene and combinations thereof. According to various embodiments said composition comprises caryophyllene, caryophyllene oxide, carene, myrcene, terpinene, terpineol, citronellol, eucalyptol, nerolidol, limonene, geraniol, menthol, iso-menthone, germacrene, pinene, cardinol, neral, geranial, menth-2-en-1-ol, pulegone, cymene, fenchol, humulene, guaiol, borneol, carene, sabinene, myrtenol, camphene, nerol, farnesol and/or carotol.

According to an embodiment said conditions and/or symptoms associated therewith comprise male urogenital and/or reproductive system infections and/or disorders and said composition comprises linalool, pinene, caryophyllene oxide, borneol and/or eucalyptol. According to an embodiment, the composition comprises at least 2 of these terpenes, at least 3, at least 4, or all 5 of the terpenes. According to an embodiment, the composition comprises linalool, pinene, caryophyllene oxide and combinations thereof. According to an embodiment, the composition comprises geraniol, linalool, pinene, caryophyllene oxide and combinations thereof. According to various embodiments said composition comprises myrcene, humulene, caryophyllene, terpineol, geraniol, germacrene, citronellol, limonene, myrcene, terpinene, menth-2-en-1-ol, borneol, eucalyptol, myrtenol, cymene, ocimene, nerolidol, camphor, sabinene, thujone, camphor, viridiflorol, menthol, iso-menthone, caryophyllene, germacrene, geraniol, nerol, neral, geranial, citronellol, carvacol, thymol, carene, myrtenol, carene and/or thujone.

According to an embodiment, the method for treating a patient comprises administering to said patient a composition in a form selected from the group consisting of tablets, gel capsules, medical patches, topicals, creams, varnishes, sublingual oils, sprays, edibles, suppositories including rectal candles, liquid nasal preparation, preparations containing micro and nano-emulsions, preparations containing micro and nano-particles, cigarettes, vaporizer liquids and combinations thereof, containing the administered composition. According to an embodiment, the product comprises tablets comprising the composition. According to an embodiment, the product comprises gel capsules comprising the composition. According to an embodiment, the product comprises medical patches containing the composition. According to an embodiment, the product comprises the composition in a form suitable for topical administration. According to an embodiment, the product comprises creams comprising the composition. According to an embodiment, the product comprising varnishes containing the composition. According to an embodiment, the composition comprises oils comprising the composition in a form suitable for sublingual administration. According to an embodiment, the product comprises an edible composition. According to an embodiment, the product comprises rectal candles comprising the composition. According to an embodiment, the product comprises cigarettes comprising the composition. According to an embodiment, the product comprises vaporizer liquids comprising the composition.

Examples 1-40

The Table presents examples of compositions as described herein.

|  | Form | Cannabinoid | Primary terpene | Content (% by weight) Cannabinoid | Content (% by weight) Primary terpene | Additive | Therapeutic effect for: |
|---|---|---|---|---|---|---|---|
| 1 | Cigarette | THC | Pinene | 3-25 | 1-10 |  | Muscle tension |
| 2 | Cigarette | CBD | Limonene | 3-25 | 1-10 |  | Dizziness |
| 3 | Cigarette | CBD | Limonene | 3-25 | 1-10 | Extract of eucommia ulmoides | Hot flashes |
| 4 | Tablet | CBG | Eucalyptol | 3-25 | 1-10 |  | Anxiety |
| 5 | Oil | CBD | humulene | 3-25 | 1-10 |  | Mood swings |
| 6 | Cigarette | THC | Eucalyptol | 3-25 | 1-10 | Extract of melissa officinalis | Irritability |
| 7 | Cigarette | THC and/or CBD | Nerolidol | 3-25 | 1-10 |  | Muscle tension |
| 8 | Tablet | CBD | Geraniol | 3-40 | 1-10 | Omega 3 | Infertility |
| 9 | Oil | CBC | Borneol | 3-40 | 1-10 |  | Urogenital infection |
| 10 | Oil | CBG | Linalool | 3-40 | 1-20 | Extract of ginseng | Stress |
| 11 | Oil | CBD | Eucalyptol | 3-40 | 1-20 |  | Irritability |
| 12 | Tablet | THC | Limonene | 3-40 | 1-20 | Extract of althea officinalis | Prostate abnormality |
| 13 | Oil | CBC | Linalool | 3-40 | 1-10 |  | Anxiety |
| 14 | Oil | CBD | Caryophyllene | 3-40 | 1-10 | Extract of andrographis paniculata | Prostate abnormality |
| 15 | Tablet | CBD | Pinene | 3-40 | 1-20 |  | Prostate cancer |
| 16 | Cigarette | THC | Geraniol | 3-25 | 1-10 |  | Hair loss |

-continued

| | Form | Cannabinoid | Primary terpene | Content (% by weight) Cannabinoid | Primary terpene | Additive | Therapeutic effect for: |
|---|---|---|---|---|---|---|---|
| 17 | Oil | CBN | Limonene | 3-40 | 1-10 | lycopene | Prostate cancer |
| 18 | Oil | CBD | terpineol | 3-40 | 1-20 | | restless |
| 29 | Tablets | CBC | Eucalyptol | 1-10 | 1-20 | Extract of vitex agnus castus | Sexual dysfunction |
| 20 | Oil | CBD | Geraniol | 3-40 | 1-20 | Daidzein | Hot flashes |
| 21 | Tablets | CBD | Pinene | 1-10 | 1-10 | | Memory loss |
| 22 | Cigarette | CBD | Eucapyptol | 3-25 | 1-10 | | Memory loss |
| 23 | Tablets | THC and/or CBD | Pinene | 1-10 | 1-10 | | Decreased muscle mass |
| 24 | Cigarette | CBD | Pinene | 3-25 | 1-10 | | Fatigue |
| 25 | Tablet | THC and/or CBD | Linalool | 3-25 | 1-10 | Extract of lepidium meyenii | Infertility |
| 26 | Cigarette | THC | Pinene | 3-25 | 1-10 | | Andropause |
| 27 | Oil | CBD | Limonene | 3-25 | 1-10 | | Andropause |
| 28 | Tablets | THC | Myrcene | 3-25 | 1-10 | Extract of serenoa serrulata | Fertility |
| 29 | Oil | CBD | Terpineol | 3-40 | 1-20 | | Hair loss |
| 30 | Oil | CBC | caryophyllene | 3-40 | 1-20 | | Hair thinning |
| 31 | Tablets | CBD | Eucalyptol | 3-40 | 1-20 | | sexual dysfunction |
| 32 | Oil | CBG | Linalool | 3-40 | 1-20 | zincum metallicum | Infertility |
| 33 | Oil | CBD | Phytol | 3-40 | 1-20 | | Weight gain |
| 34 | Oil | CBD | Terpineol | 3-40 | 1-20 | | Body odor |
| 35 | suppositories | THC and/or CBD | Geraniol | 3-40 | 1-20 | | Andropause |
| 36 | Oil | THC and/or CBD | Terpinene | 3-40 | 1-20 | Extract of apium graveolens | Urogenital infection |
| 37 | suppositories | THC and/or CBD | caryophyllene | 3-40 | 1-20 | | Urogenital infection |
| 38 | Oil | CBD | Eucalyptol | 3-40 | 1-20 | Extract of Eucommia ulmoides | sexual dysfunction |
| 39 | Oil | CBD | Eucalyptol | 3-40 | 1-20 | | Hair loss |
| 40 | Tablet | CBC | Limonene | 1-10 | 1-10 | | Infertility |

[1] Oil herein refers to a composition containing an extract of a cannabis plant material.

Example 41: Treating an Andropause Man with Symptoms of Anxiety

An andropause man at the age of 53 with symptoms of stress and anxiety is treated by administering *Cannabis* cigarettes. The cigarettes contain 0.5% THC, 15% CBD and a primary terpene containing linalool. Administrating involves 5 puffs per dose, 3 times per day. Each administrated dose contains 2 mg of THC, 50 mg of CBD and 8 mg linalool.

Example 42: Treating an Andropause Man with Symptoms of Stress

An andropause man at the age of 59 with symptoms of depression is treated by administering *Cannabis* oil sublingually. The oil contains 5.5% THC, 9% CBD and a primary terpene containing limonene. Administrating involves 5 droplets per dose, 3 times per day. Each administrated dose contains 16 mg of THC, 26 mg of CBD and 10 mg limonene.

Example 43: Treating a Man with Symptoms of Urine Incontinence Due to Prostate Abnormality A man at the age of 45 with symptoms of urine incontinence due to prostate abnormality is treated by administering ground *Cannabis* in a vaporizer. The ground *Cannabis* contains 0.4% THC, 12% CBD and a primary terpene containing pinene. Administrating involves 10 puffs per dose, twice a day. Each administrated dose contains 2.5 mg of THC, 73 mg of CBD and 15 mg pinene.

Example 44: Treating a Man with Prostate Cancer

A man at the age of 50 diagnosed with prostate cancer is treated by administering ground *Cannabis* in a vaporizer. The ground *Cannabis* contains 10% THC, 1% CBD and a primary terpene containing caryophyllene. Administrating involves 5 puffs per dose, 3 times per day. Each administrated dose contains 50 mg of THC, 5 mg of CBD and 12 mg caryophyllene.

Example 45: Treating Decreased Physical and Mental Energy in an Andropausal Male An andropausal male at the age of 60 with symptoms of decreased physical and mental energy is treated by administering *Cannabis* oil sublingually. The *Cannabis* oil contains 2% THC, 25% CBD and a primary terpene containing eucalyptol. Administrating involves 1 droplet per dose, twice a day. Each administrated dose contains 0.6 mg of THC, 8 mg of CBD and 3 mg eucalyptol.

Example 46: Treating a Man with Sexual Dysfunction

A man at the age of 38 with sexual dysfunction is treated by administering ground *Cannabis* in a vaporizer. The ground *Cannabis* contains 9.2% THC, 5.7% CBD and a primary terpene containing limonene. Administrating involves 3 puffs per dose, 3 times per day. Each administrated dose contains 21 mg of THC, 13 mg of CBD and 12 mg limonene.

Example 47: Treating a Man with Symptoms of Mood Swings

An andropausal man at the age of 51 with symptoms of mood swings is treated by administering tablets of *Cannabis* extract. Each tablet contains 2% THC, 25% CBD and a primary terpene containing eucalyptol. Administrating involves 1 tablet per dose, twice a day. Each administrated dose contains 0.7 mg of THC, 9.5 mg of CBD and 3 mg eucalyptol.

Example 48: Treating a Man with Urogenital System Infection

A man at the age of 30 diagnosed with urogenital system infection is treated by administering *Cannabis* oil sublingually. The *Cannabis* oil contains 2% THC, 25% CBD and a primary terpene containing borneol. Administrating involves 3 droplets per dose, twice a day. Each administrated dose contains 1.8 mg of THC, 24 mg of CBD and 8 mg borneol.

Example 49: Treating a Man with Reproductive System Infection

A man at the age of 45 diagnosed with reproductive system infection is treated by administering *Cannabis* oil sublingually. The *Cannabis* oil contains 12.5% THC, 12.5% CBD and a primary terpene containing caryophyllene. Administrating involves 1 droplet per dose, 3 times per day. Each administrated dose contains 5.5 mg of THC, 5.5 mg of CBD and 3 mg caryophyllene.

Example 50: Treating Memory Loss in an Andropausal Male

An andropausal male at the age of 54 with symptoms of memory loss is treated by administering *Cannabis* cigarettes. The cigarettes contain 17.5% THC, 0.05% CBD and a primary terpene containing pinene. Administrating involves 7 puffs per dose, twice a day. Each administrated dose contains 77 mg of THC, 0.2 mg of CBD and 20 mg pinene.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for treating a condition selected from the group consisting of androgen deficiency, infertility, urogenital or reproductive system infections and/or disorders and combinations thereof in a male subject diagnosed as suffering from said condition, the method comprising administering to the male subject a therapeutically effective amount of a composition comprising
   (i) at least one cannabinoid at a total concentration of at least 5% by weight, wherein said at least one cannabinoid comprises tetrahydrocannabinol (THC), and wherein at least 50% of said at least one cannabinoid is in decarboxylated form,
   (ii) at least two terpenes selected from the group consisting of thujone, pinene, limonene, cymene, caryophyllene, caryophyllene oxide, eucalyptol, terpineol, sabinene, carene, geraniol, camphor and citronellol at a total concentration of at least 0.5% by weight, and
   (iii) at least 5% by weight of a non-cannabinoid, non-terpene carrier,
   wherein the composition is provided in a delivery form selected from the group consisting of tablets, gel capsules, sublingual oils, edibles, cigarettes, vaporizer liquids, nasal preparations, and combinations thereof, and
   wherein a total amount of terpenes to a total amount of cannabinoids in said composition is from about 0.1:1 to about 0.5:1, and
   wherein said composition is produced by adding at least one isolated terpene to a *cannabis* extract.

* * * * *